(12) United States Patent  
Schneider et al.

(10) Patent No.: US 8,328,235 B2  
(45) Date of Patent: Dec. 11, 2012

(54) SIDE-BY-SIDE VEHICLE

(75) Inventors: Michael D Schneider, Dalbo, MN (US); Michael J Hanten, Delano, MN (US); Cal W Johnson, Gem Lake, MN (US); Kevin Van Bronkhorst, St. Croix Falls, WI (US)

(73) Assignee: Polaris Industries Inc., Medina, MN (US)

( * ) Notice: Subject to any disclaimer, the term of this patent is extended or adjusted under 35 U.S.C. 154(b) by 365 days.

(21) Appl. No.: 12/796,495

(22) Filed: Jun. 8, 2010

(65) Prior Publication Data

US 2011/0298189 A1 Dec. 8, 2011

(51) Int. Cl.  
*B60R 21/02* (2006.01)

(52) U.S. Cl. .............. 280/748; 280/749; 296/187.12; 296/190.03; 296/146.1

(58) Field of Classification Search .............. 280/748, 280/749; 296/187.12, 190.03, 193.05, 202, 296/35.2, 146.1, 146.9  
See application file for complete search history.

(56) References Cited

U.S. PATENT DOCUMENTS

| | | | | | |
|---|---|---|---|---|---|
| 4,083,561 | A | * | 4/1978 | Daffer, Jr. ................. | 473/432 |
| 4,215,895 | A | * | 8/1980 | Phillips ................... | 296/202 |
| 5,135,080 | A | * | 8/1992 | Haston .................... | 187/222 |
| 5,588,672 | A | * | 12/1996 | Karlow et al. ............ | 280/730.2 |
| 6,135,497 | A | * | 10/2000 | Sutherland et al. ........ | 280/749 |
| 6,502,859 | B1 | * | 1/2003 | Svetlik .................... | 280/749 |
| 6,530,448 | B2 | * | 3/2003 | Abels et al. .............. | 180/271 |
| 6,773,054 | B2 | * | 8/2004 | Martini .................... | 296/148 |
| D498,435 | S | | 11/2004 | Saito et al. | |
| D503,905 | S | | 4/2005 | Saito et al. | |
| 7,036,869 | B1 | * | 5/2006 | Stipanovich ............. | 296/152 |
| 7,125,069 | B2 | * | 10/2006 | Cacucci et al. .......... | 296/190.03 |
| 7,207,613 | B2 | * | 4/2007 | Walter et al. ............. | 296/24.4 |
| D555,036 | S | | 11/2007 | Eck | |
| 7,464,962 | B2 | * | 12/2008 | Hakansson et al. ....... | 280/749 |
| 7,556,291 | B2 | * | 7/2009 | Gale et al. ................ | 280/749 |
| 7,588,266 | B2 | * | 9/2009 | Fengel et al. ............. | 280/748 |
| 8,123,279 | B2 | * | 2/2012 | Orr et al. .................. | 296/148 |
| 2001/0033084 | A1 | * | 10/2001 | Murray et al. ............ | 296/24.1 |
| 2002/0190513 | A1 | * | 12/2002 | Svetlik .................... | 280/749 |
| 2007/0018442 | A1 | * | 1/2007 | Kwok ...................... | 280/749 |
| 2008/0023240 | A1 | | 1/2008 | Sunsdahl et al. | |
| 2008/0023249 | A1 | | 1/2008 | Sunsdahl et al. | |
| 2008/0048424 | A1 | * | 2/2008 | Hakansson et al. ....... | 280/749 |
| 2008/0238045 | A1 | * | 10/2008 | Garner .................... | 280/728.2 |
| 2008/0308334 | A1 | | 12/2008 | Leonard et al. | |
| 2009/0000849 | A1 | | 1/2009 | Leonard et al. | |
| 2009/0071737 | A1 | | 3/2009 | Leonard et al. | |

(Continued)

FOREIGN PATENT DOCUMENTS

| | | |
|---|---|---|
| EP | 1 600 326 | 11/2005 |
| EP | 1 602 523 | 12/2005 |
| WO | WO 03/042026 | 5/2003 |
| WO | WO 03/055716 | 7/2003 |

OTHER PUBLICATIONS

POLARIS Industries, Ranger Catalog, 2007 (28 pgs.).

(Continued)

*Primary Examiner* — Toan To  
(74) *Attorney, Agent, or Firm* — Faegre Baker Daniels LLP

(57) ABSTRACT

The present invention relates to all terrain vehicles having at least a pair of laterally spaced apart seating surfaces. More particularly, the present invention relates to side-by-side all terrain vehicles having plural rows of seats.

31 Claims, 27 Drawing Sheets

U.S. PATENT DOCUMENTS

| | | | |
|---|---|---|---|
| 2009/0071739 | A1 | 3/2009 | Leonard et al. |
| 2009/0091101 | A1 | 4/2009 | Leonard et al. |
| 2009/0121518 | A1 | 5/2009 | Leonard et al. |
| 2009/0183937 | A1 | 7/2009 | Yamamura et al. |
| 2009/0184534 | A1 | 7/2009 | Smith et al. |
| 2009/0184536 | A1 | 7/2009 | Kubota |
| 2009/0184537 | A1 | 7/2009 | Yamamura et al. |
| 2009/0184541 | A1 | 7/2009 | Yamamura et al. |
| 2009/0301830 | A1 | 12/2009 | Kinsman et al. |
| 2009/0302590 | A1 | 12/2009 | Van Bronkhorst et al. |

OTHER PUBLICATIONS

POLARIS Industries, Ranger Catalog, 2008 (32 pgs.).
Pictures of Vehicle publicly disclosed in Jul. 2008 (3 pages).
Robby Gordon's RZR-S 4 seater—Yamaha Rhino Forum—Rhino Forums.net, dated Nov. 11, 2008 (14 pages).
2008 Dealer Expo Top UTV Products—Rhinos, Rangers and RZRs were everything at th . . . , dated Feb. 18, 2008, (6 pages).
European Patent Office, International Search Report for PCT/2010/038709, Sep. 14, 2010, 5 pages.
European Patent Office, Written Opinion of the International Search Authority for PCT/US2010/038709, Sep. 14, 2009, 6 pages.
POLARIS Industries, Ranger RZR Catalog, 2008 (12 pgs.).
Side by Side Sports.com, Polaris Ranger Rear Cage Extension and Seat Set, available at www.sidebysidesports.com/porarecaexan.html, last accessed on Mar. 29, 2011.
Tellico 4x4.com, Polaris Ranger Accessories and Ranger Parts for Crew 500, 700, 800, XP, available at www.tellico4x4.com/index.php/cPath/3523, last accessed on Mar. 29, 2011.

* cited by examiner

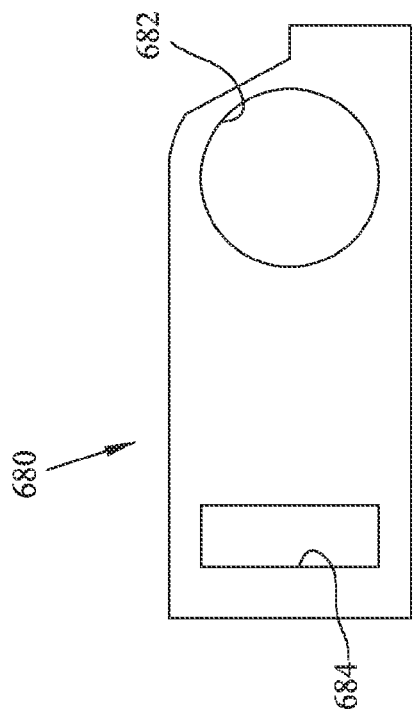
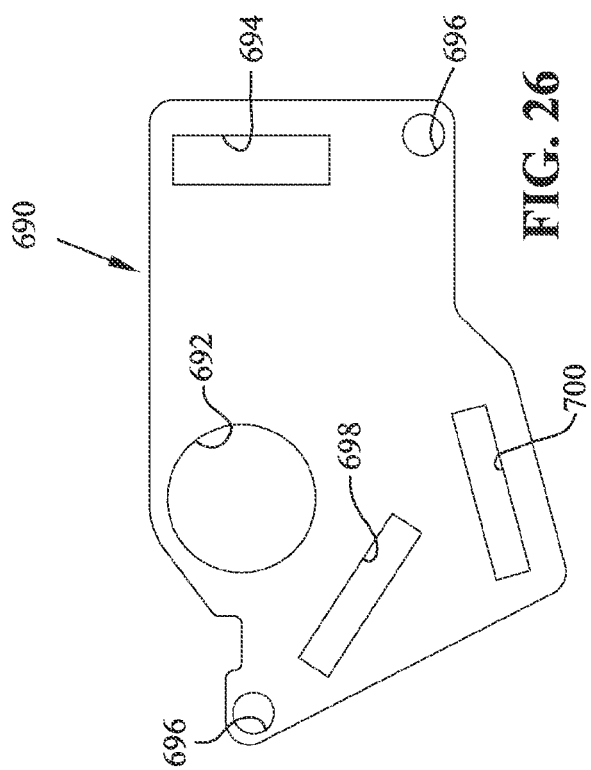

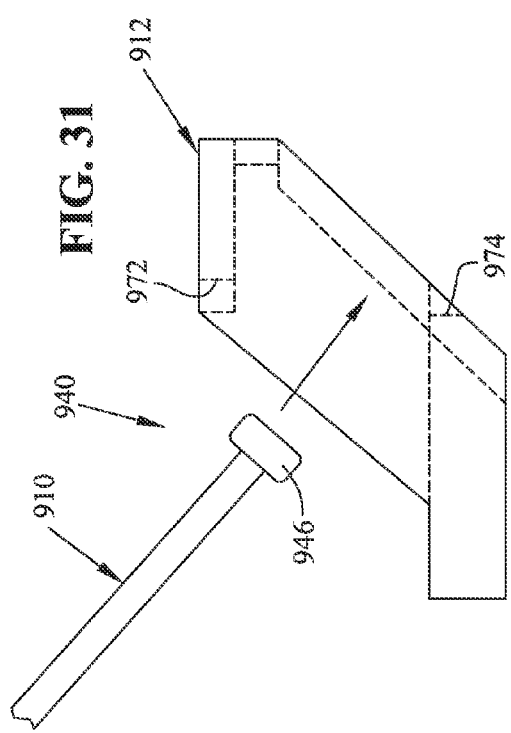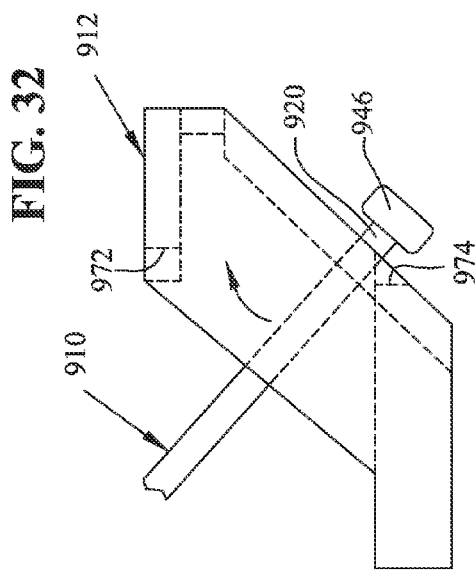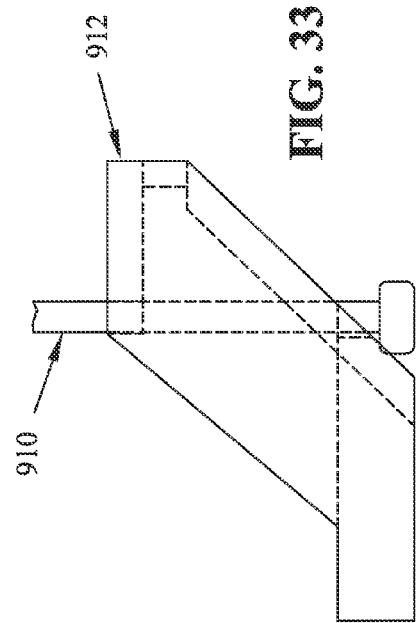

SIDE-BY-SIDE VEHICLE

FIELD OF THE DISCLOSURE

The present invention relates to side-by-side all terrain vehicles having netting enclosing the seating area.

BACKGROUND

Generally, all terrain vehicles ("ATVs") and utility vehicles ("UVs") are used to carry one or two passengers and a small amount of cargo over a variety of terrains. Due to increasing recreational interest in ATVs, specialty ATVs, such as those used for trail riding, racing, and cargo hauling have entered the market place. Most ATVs include seating for up to two passengers which are either seated side-by-side or with the passenger positioned behind the driver of the ATV. Side-by-side ATVs, in which the driver and passenger are seated beside each other on laterally spaced apart seats, have become popular because of the ability to allow the passenger to share the driver's viewpoint.

SUMMARY

According to an illustrative embodiment of the present disclosure, a utility vehicle is shown comprising a frame extending in a generally longitudinal direction, a drive train supported by the frame, a plurality of wheels operably coupled to the frame, a first seating area, and a side net assembly comprised of a pivotal bar and a net supported by the pivotal bar. The bar is pivotally mounted at a first end to the vehicle, and is latchable to the vehicle at a second opposite end, whereby the side net assembly can be in a latched position when a rider is in the vehicle and can be collapsed to allow ingress and egress of a rider.

According to a further illustrative embodiment of the present disclosure, a utility vehicle is shown which comprises a frame extending in a generally longitudinal direction, a drive train is supported by the frame, a plurality of wheels are operably coupled to the frame, a first seating area is positioned at a first longitudinal position relative to the frame, and a frame canopy encloses the first seating area, defined by a plurality of frame tubes coupled to the frame defining an envelope around the first seating area. A side net assembly is supported by one of the frame uprights and being latchable to another of the frame tubes, whereby the side net assembly can be in a latched position when a rider is in the vehicle and can be collapsed to allow ingress and egress of a rider.

According to a further illustrative embodiment of the present disclosure, a side net assembly is provided for a utility vehicle, where the vehicle includes a frame extending in a generally longitudinal direction, a first seating area at a first longitudinal position relative to the frame and a frame canopy enclosing the first seating area. The frame is comprised of a plurality of frame tubes coupled to the frame defining an envelope around the first seating area. The side net assembly comprises a pivotal bar and a net supported by the pivotal bar, where the side net assembly is supported by one of the frame tubes and is latchable to another of the frame tubes. The side net assembly can be in a latched position when a rider is in the vehicle and can be collapsed to allow ingress and egress of a rider The above mentioned and other features of this invention, and the manner of attaining them, will become more apparent and the invention itself will be better understood by reference to the following description of embodiments of the invention taken in conjunction with the accompanying drawings.

BRIEF DESCRIPTION OF THE DRAWINGS

FIG. 25 shows a plan view of a first clasp;

FIG. 26 shows a plan view of a second clasp;

FIG. 28A is an enlarged view of the portion denoted in FIG. 28;

FIGS. 31-33 show a diagrammatic progressive view of the side net post and pivotal link.

Figure 1:
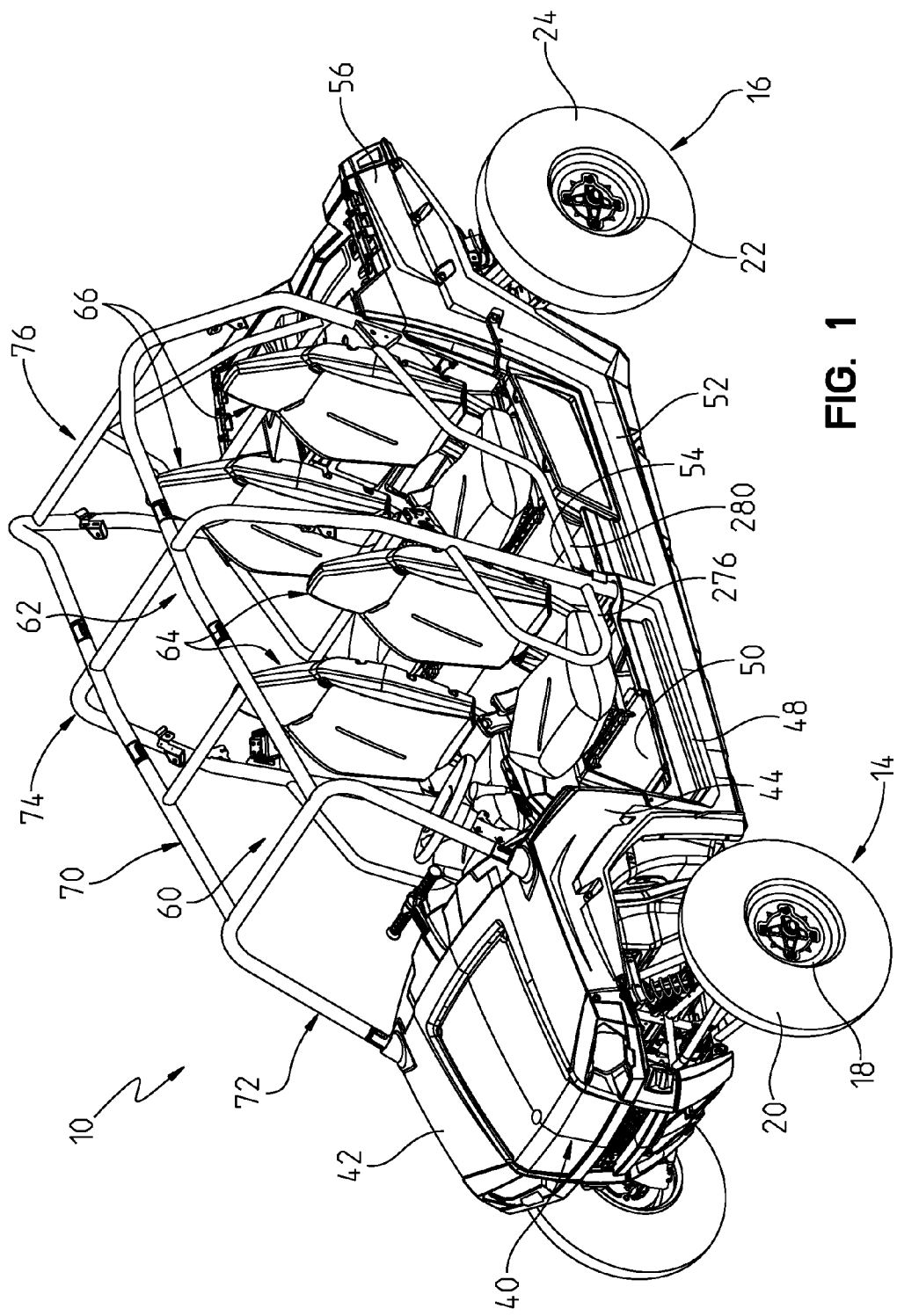
FIG. 1 shows a left front perspective view of the vehicle of the present disclosure.

Corresponding reference characters indicate corresponding parts throughout the several views. Although the drawings represent embodiments of the present invention, the drawings are not necessarily to scale and certain features may be exaggerated in order to better illustrate and explain the present invention.

DETAILED DESCRIPTION OF THE EMBODIMENTS

The embodiments disclosed below are not intended to be exhaustive or to limit the invention to the precise forms disclosed in the following detailed description. Rather, the embodiments are chosen and described so that others skilled in the art may utilize their teachings. For example, while the following description refers primarily to UVs, certain features described herein may be applied to other applications such as ATVs, snowmobiles, motorcycles, mopeds, etc.

With reference first to FIGS. 1-6, the vehicle of the present disclosure will be described. The vehicle is shown generally at 10 and is commonly referred to as an all terrain vehicle (ATV), a side-by-side vehicle (SxS) or a utility vehicle. As shown, vehicle 10 generally comprises a frame 12 (FIG. 2) supported by ground engaging members 14 and 16. As shown in this disclosure, ground engaging members 14 and 16 are comprised of wheels 18 and tires 20; and wheels 22 and tires 24. Vehicle 10 further comprises a drive train 30 (FIG. 2) operatively connected to frame 12 and drivingly connected to one or more of the ground engaging members 14, 16. In the present disclosure, the drive train 30 is comprised of a fuel-burning engine and transmission combination, together with a driveshaft extending between the drive train and the front ground engaging members 14. However, any drive train could be contemplated such as hybrid, fuel cell or electric. The drive train 30, the front and rear suspension assemblies, and steering assemblies are more thoroughly described in our pending application Ser. Nos. 11/494,891 filed Jul. 28, 2006 and 11/494,890 filed Jul. 28, 2006, the subject matter of which is incorporated herein by reference.

Figure 2:
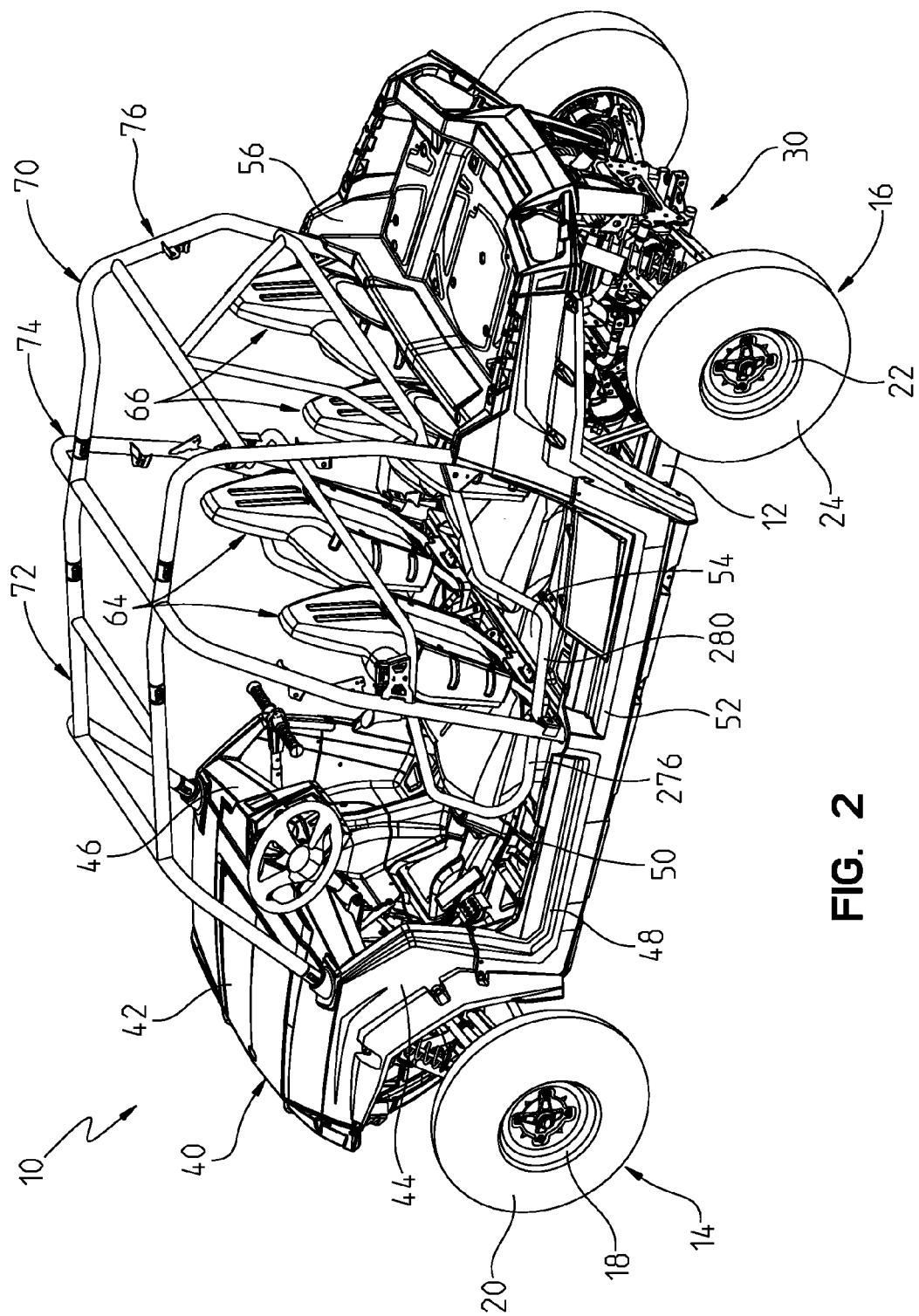
FIG. 2 shows a left rear perspective view of the vehicle of FIG. 1.
Figure 3:
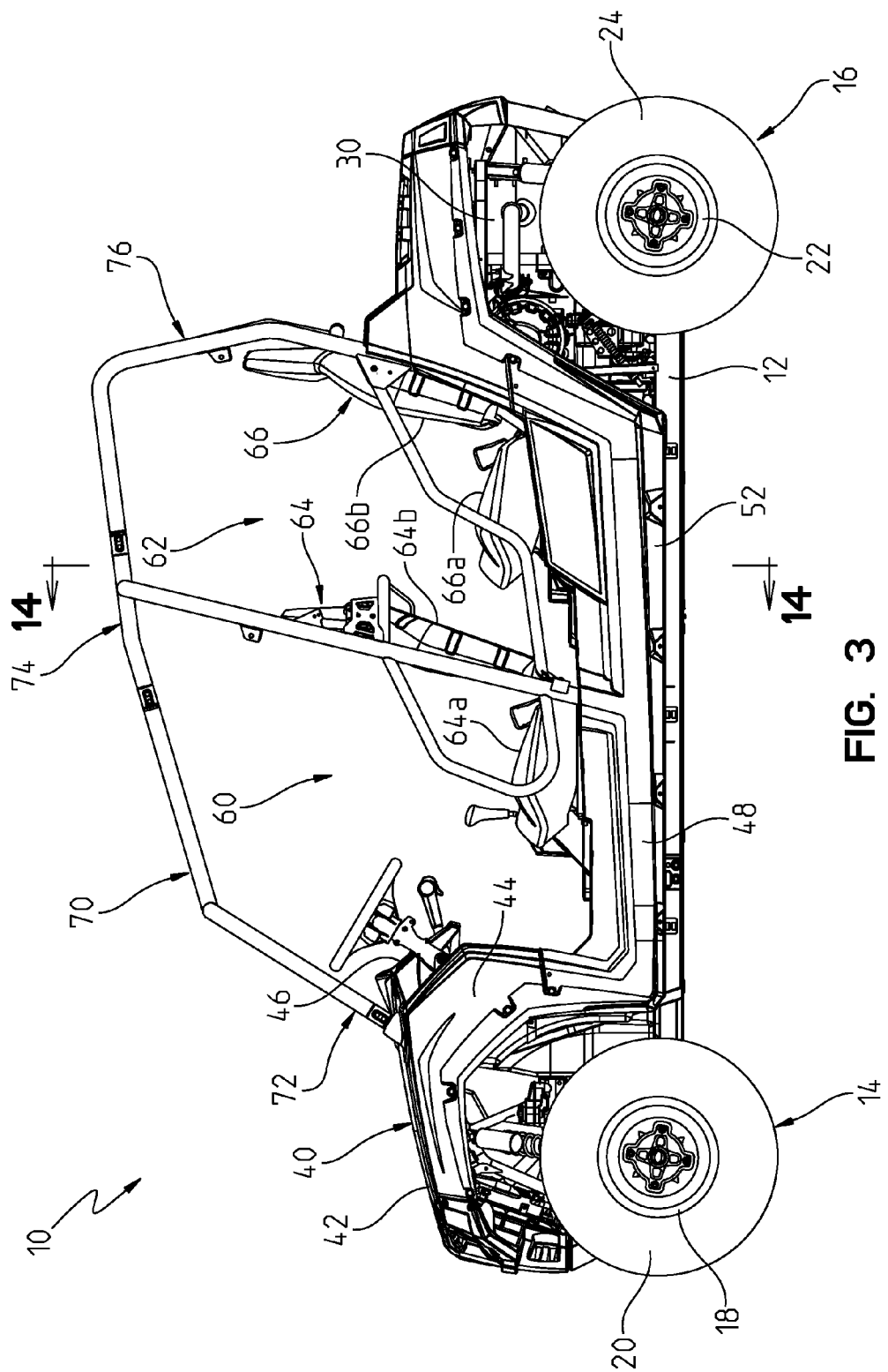
FIG. 3 shows a left side view of the vehicle of FIG. 1.

As shown in FIGS. 1 and 2, vehicle 10 further includes a body portion or chassis shown generally at 40 to include a hood 42, front fender 44, dash 46, sideboard 48, front floorboard 50, rear sideboard 52, rear floorboard 54 and rear cargo area 56. As also shown, vehicle 10 is comprised of two seating areas, namely a front seating area 60 and a rear seating area 62 where front seating area 60 is comprised of side-by-side seats, shown as bucket seats 64; and rear seating area 62 is comprised of side-by-side seats, shown as bucket seats 66. As shown best in FIG. 3, front seats include a seat bottom 64a and a seat back 64b, while rear seat 66 includes a seat bottom 66a and a seat back 66b. Vehicle 10 also includes a roll cage 70 comprised of a front section 72, a center section 74, and a rear section 76, where the front 72, center 74 and rear 76 sections are comprised of a plurality of frame tubes attached to each other and to frame 12 as more fully described herein.

Figure 9:
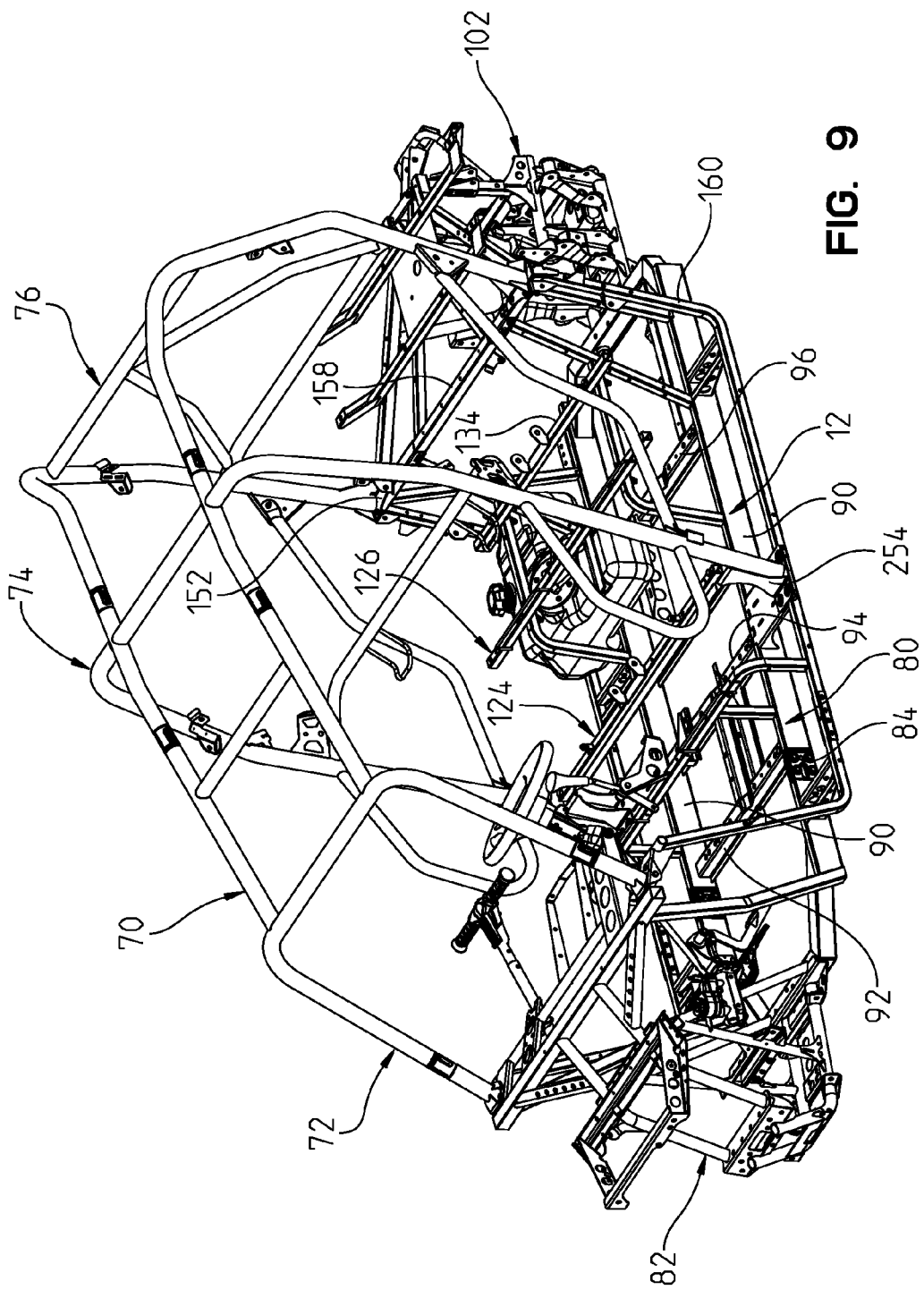
FIG. 9 is a front perspective view of the vehicle frame and roll cage.
Figure 10:
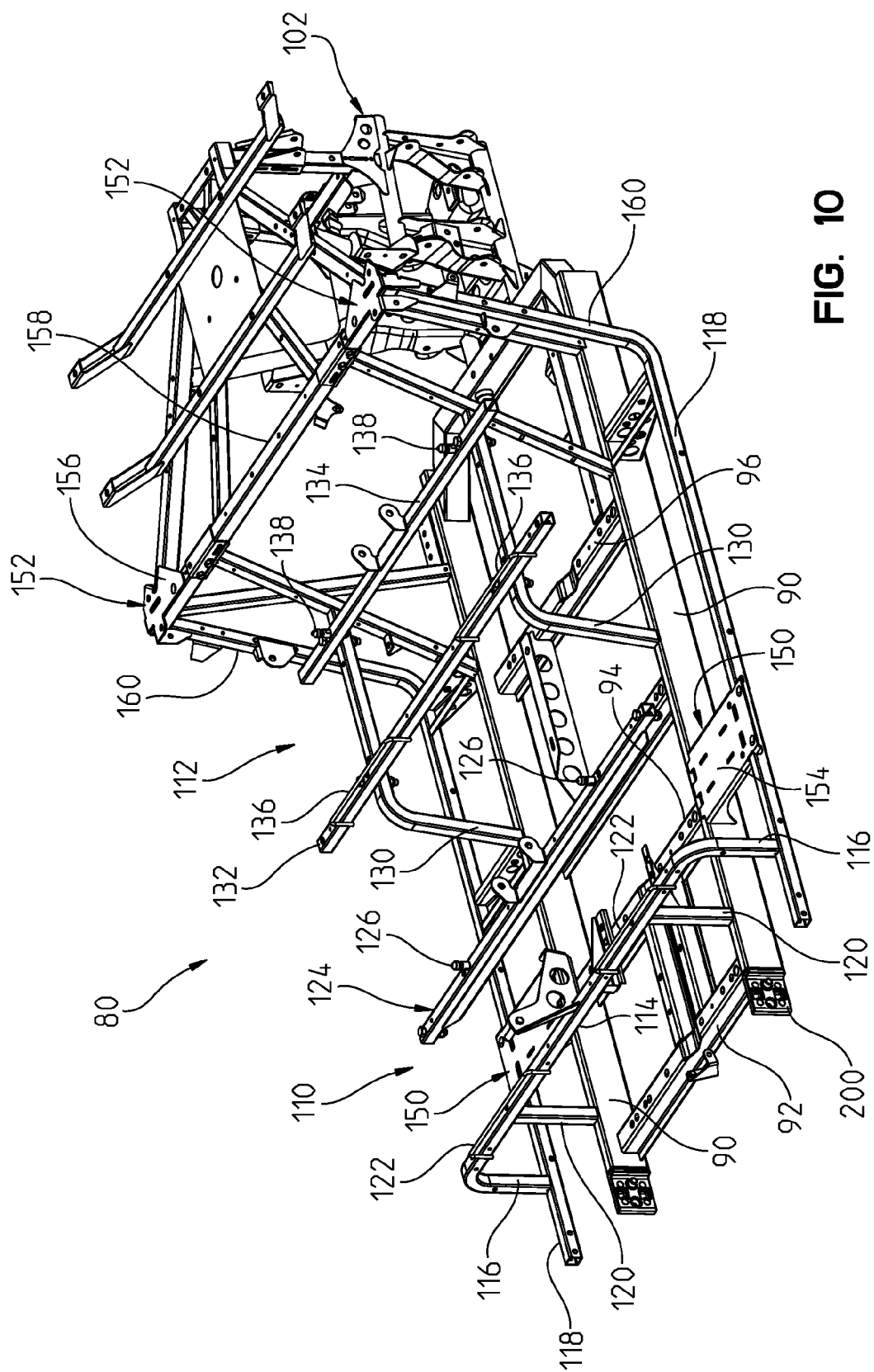
FIG. 10 shows an enlarged view of the vehicle main frame.

With respect now to FIGS. 7-12, frame 12 will be described in greater detail. Frame 12 is generally comprised of a main frame section 80 and a front frame section 82, where the two sections are interconnected by way of couplers 84. With reference first to FIGS. 9 and 10, the main frame section 80 is generally comprised of two longitudinal frame rails 90 interconnected by a plurality of struts such as 92, 94, 96 attaching frame rails 90 together in a predefined spaced-apart relation. Main frame section 80 also comprises a drive train mounting section 102 extending at a rear portion of main frame 80.

With respect now to FIG. 10, frame 80 also defines front seat support platform 110 and rear seat support platform 112. Front seat support platform 110 includes a transversely extending tube 114 having legs 116 attached to outer frame rail 118 and inner legs 120 directly attached to frame tubes 90. Frame tube 114 spans the distance across frame rails 118 and the frame tubes 90. With reference still to FIG. 10, frame tubes 114 include a latch hook 122 as described further herein. Front seat support platform 110 further includes a transverse frame member 124 which as best shown in FIG. 9 is attached to roll cage center section 74 as further described herein. Frame tube 124 includes latching pins 126 for interengagement with seats 64.

With reference still to FIG. 10, rear seat support platform 112 is comprised of frame tubes 130 which provide an elevated platform for transverse frame tubes 132 and 134. Frame tubes 132 have latch hooks 136 (similar in nature to latch hooks 122) and frame tube 134 has latching pins 138 (similar to latching pins 126).

With respect still to FIG. 10, main frame member 80 further includes roll cage mounting sections 150 and 152. As shown, mounting section 150 includes a plate 154 on each side spanning tube 90 and frame rail 118. Mounting section 152 is provided by a plate 156 provided on frame tube 158 which spans uprights 160 of frame rail 118.

Figure 11:
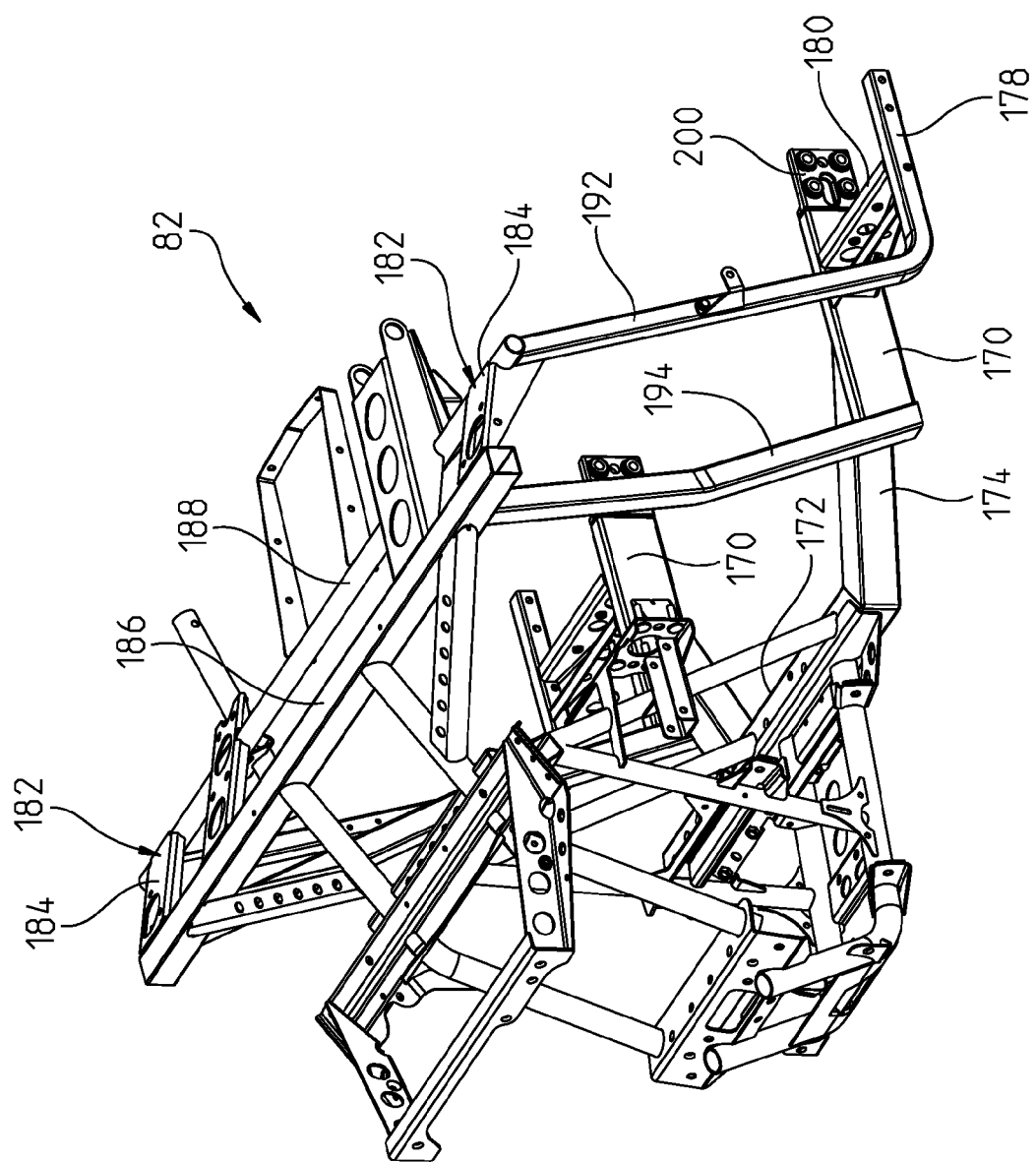
FIG. 11 shows an enlarged view of the vehicle front frame.

With respect now to FIG. 11, front frame member 82 will be described in greater detail. Front frame member 82 includes frame tubes 170 which complement frame tubes 90, and are held in a fixed relation by tubes 172, 174. Frame rails 178 are fixed in relation to frame tubes 170 by way of a strut 180. Front frame 82 further comprises front roll cage mounting sections 182 comprising plates 184 positioned between cross tubes 186, 188, and elevated by way of uprights 192, 194.

As described, frame 80 is comprised of main frame member 90 and front frame member 82. Splitting the frame into two separate modular subassemblies allows for easier processing of the entire vehicle 10. Due to the load on the frame tubes 90, 170, the connection provided by coupler 84 takes place at a longitudinal position from either end of the frame 80, within a distance from the end, of approximately 30% of the length of frame 80. The coupler 84 could also be placed at the rear of frame tubes 90.

Figure 12:
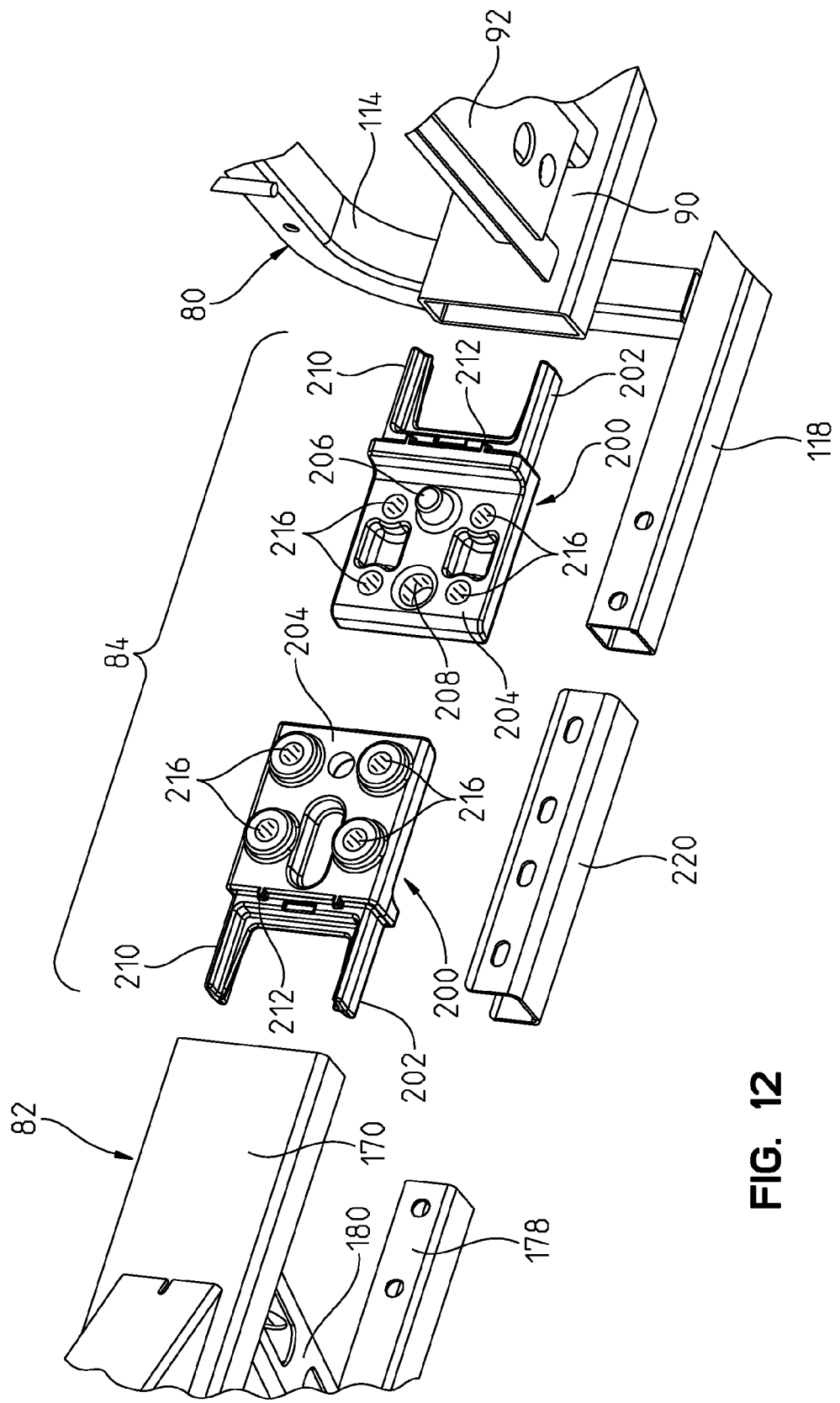
FIG. 12 is a partially exploded and fragmented perspective view showing the coupler for coupling the main frame and front frame together.

With reference now to FIG. 12, frame tube coupler 84 is shown poised for receipt within frame tubes 90, 170. As shown, coupler 84 is comprised of individual coupler members 200. The coupler members 200 are identical, and each comprises a tube connecting section 202 and an alignment or interengaging section 204. The interengaging sections 204 include interengaging elements, shown here as projections 206 and recesses 208. Projections 206 are shown as frustoconical in shape, and recesses have a complementary frustoconical recessed configuration. The interengaging sections 204 further comprise apertures 216 which self align with apertures 216 in the opposite interengaging section 204 when complementary projections 206 and recesses 208 align. As also shown in FIG. 12, tube connecting sections 202 include legs 210 and stand-offs 212. Finally, a connecting bracket 220 is provided for connecting frame rails 118 and 178.

To connect main frame member 80 and front frame member 82, the individual coupler members 200 are each inserted into respective ends of the frame tubes 90, 170 until such time as stand-offs 212 abut an end edge of the frame tubes 90, 170. Stand-off 212 leaves a weld gap for welding the individual couplers 200 to the frame tubes 90, 170. The individual couplers 200 are shown welded in place to respective frame tubes 90, 170 in FIGS. 10 and 11.

Coupler 84 allows alignment of frame tubes 90 and 170 as individual couplers 200 are each aligned with respective frame tubes 90, 170 and individual couplers 200 are alignable to each other. Couplers 84 also allow alignment of frame tubes 90, 170 when the main frame 80 and front frame 82 are not themselves perfectly aligned. That is, once individual coupler members are close to alignment, fasteners (not shown) are positioned into and through complementary apertures 216, whereby the fasteners may be drawn tight until the projections and recesses are in engagement with each other. This aligns the tubes 90, 170. At the same time, any shear forces on the coupler 84 is taken up through the projections and recesses, not through the fasteners.

Figure 13:
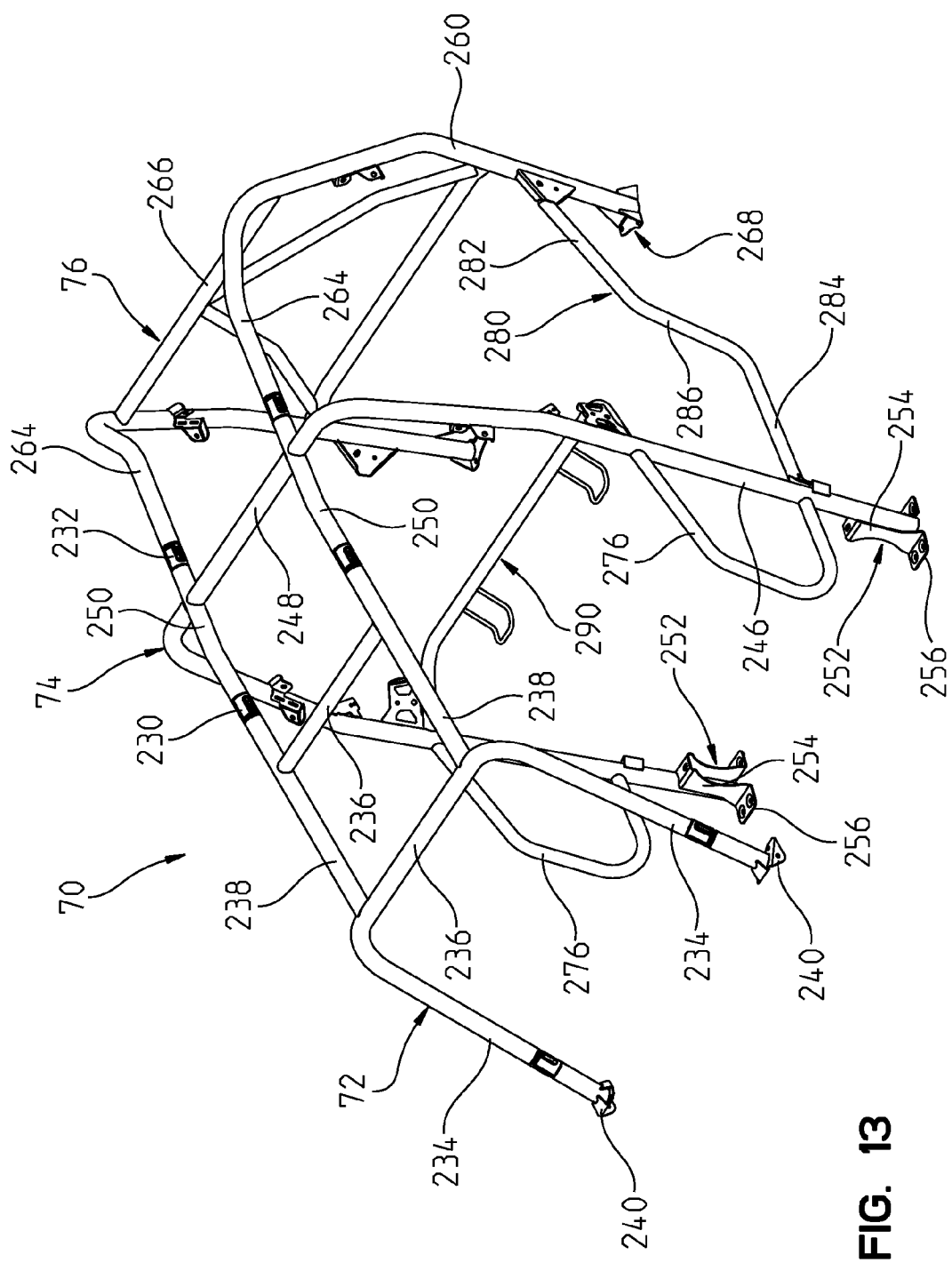
FIG. 13 shows a top perspective view of the roll cage.

With respect now to FIG. 13, roll cage 70 is shown comprised of front 72, center 74 and rear 76 roll cage sections. Each of athe cage sections comprise plural frame tubes as shown. The cage sections are shown connected at connection joints 230 and 232. Such joints are known in the industry.

Front roll cage section 72 is comprised of uprights 234, transverse sections 236, and longitudinally extending sections 238. Mounts 240 are provided at the front and extend from uprights 234. It should be appreciated that mounts 240 cooperate with mounting sections 182 (FIG. 11) by way of fasteners (not shown).

Center roll cage section 74 is comprised of uprights 246, transverse section 248 and longitudinally extending sections 250. Mounts 252 are provided at the lower end of upright 246 and is comprised of stand-offs 254 and mounting brackets 256. It should be appreciated that mounting brackets 256 cooperate with mounting section 150 (FIG. 10) by way of fasteners (not shown).

Rear roll cage section 76 is comprised of uprights 260, transverse section 262, and longitudinally extending section 264. Mounts 268 are provided at the lower end of uprights 260 which cooperate with mounting sections 152 (FIG. 10).

Roll cage assembly 70 comprises ergonomic features for the driver and passengers. First, supports 276 are provided on uprights 246 extending forwardly. These supports are positioned adjacent to seats 64, as shown in FIGS. 1 and 2, and enclose the driver and front passenger. Second, supports 280 are provided between uprights 246 and 260, and include an upper portion 282, lower portion 284 and transition portion 286. As shown in FIG. 1, support 280 is shown in position where lower portion extends across the entry spaced above floorboard 54. Transition section 286 and upper portion 282 extend across the seat 66 and enclose the rear passengers. Finally, rear passenger hand bar 290 extends between uprights 246, and as best shown in FIG. 14, extends behind front seats 64, as described below.

Figure 14:
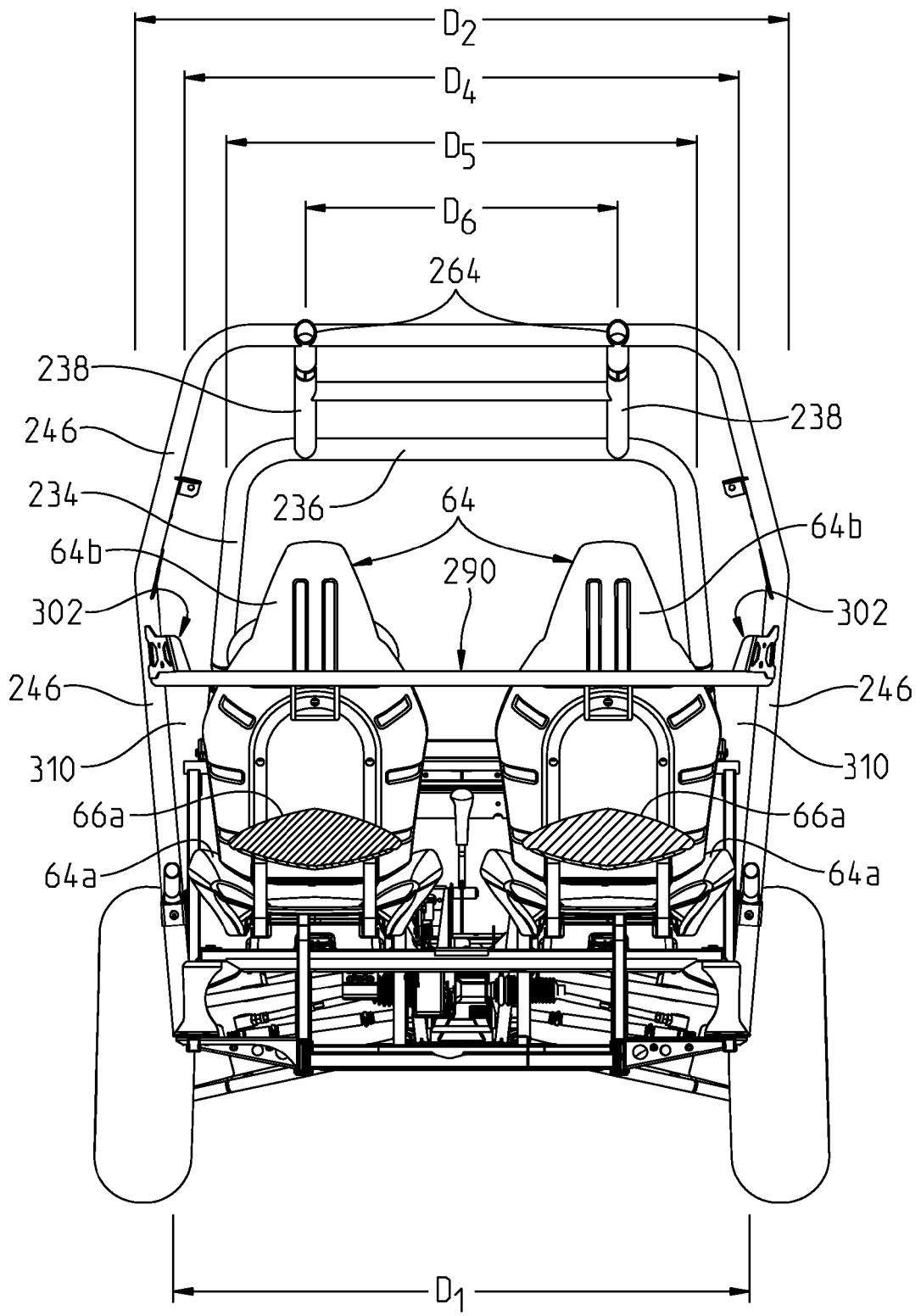
FIG. 14 shows a cross-sectional view through lines 12-12 of FIG. 3.
Figure 15:
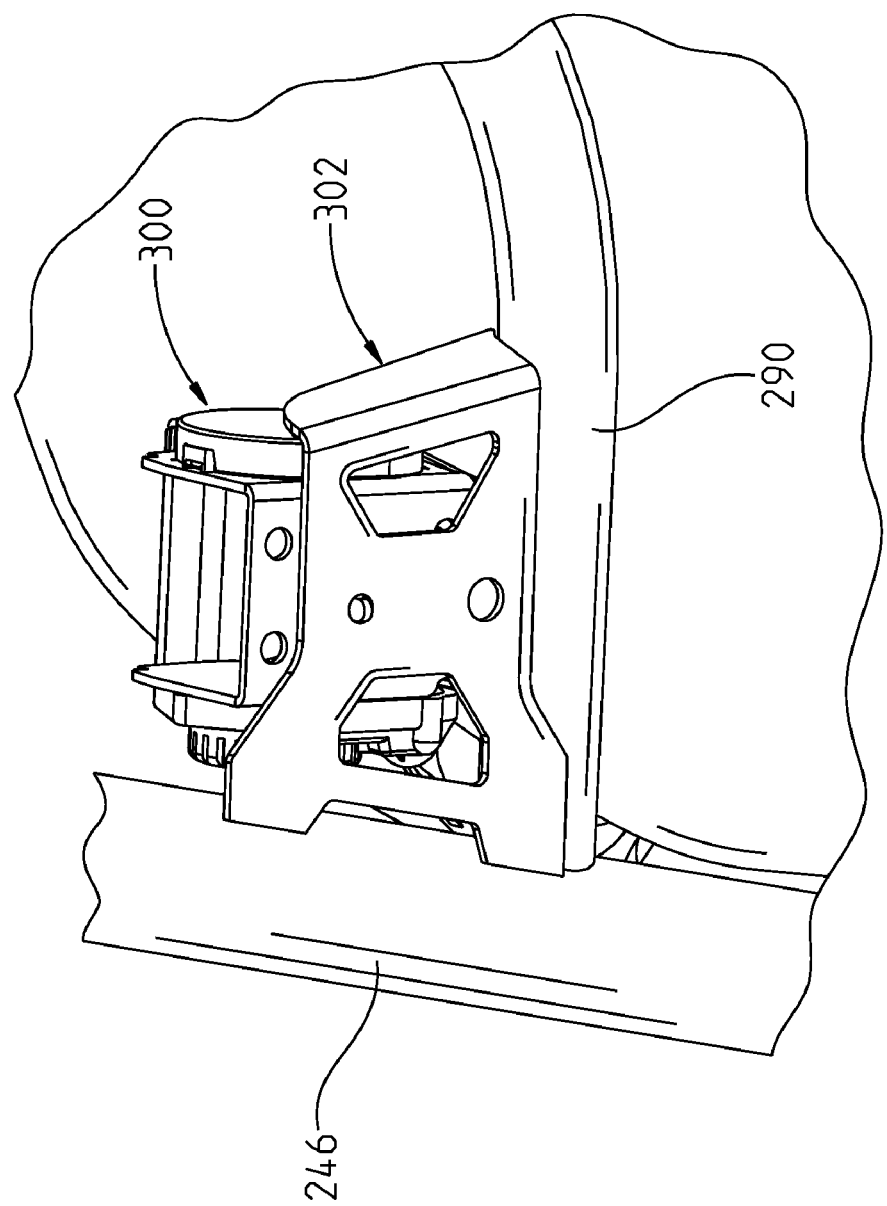
FIG. 15 shows an enlarged view of the seat belt retractor.

As shown in FIG. 14, rear seat bottoms 66a are shown elevated relative to front seat bottoms 64a. Thus the rear passenger hand bar 290, which extends behind front seat backs 64b is, positioned at shoulder height relative to the persons in front seats 64. As shown best in FIG. 15, seat belt retractor 300 is positioned on hand bar 290, and is attached to bracket 302 which is connected between hand bar 290 and upright 246. This places the seat belt retractor 300 in a convenient location for those in front seats 64, yet keeps the retractor away from the rear passengers.

Vehicle 10 is also ergonomically designed for the rear passenger's riding experience. For example, and with respect still to FIG. 14, uprights 246 are shown flaring outwardly. For example, uprights at the frame are spaced apart by a dimension of $D_1$ but extend upwardly to a dimension of $D_2$ which is larger than $D_1$. This provides a spacing at 310 between uprights and seat backs 64b providing extra room for the passenger's knees.

Figure 4:
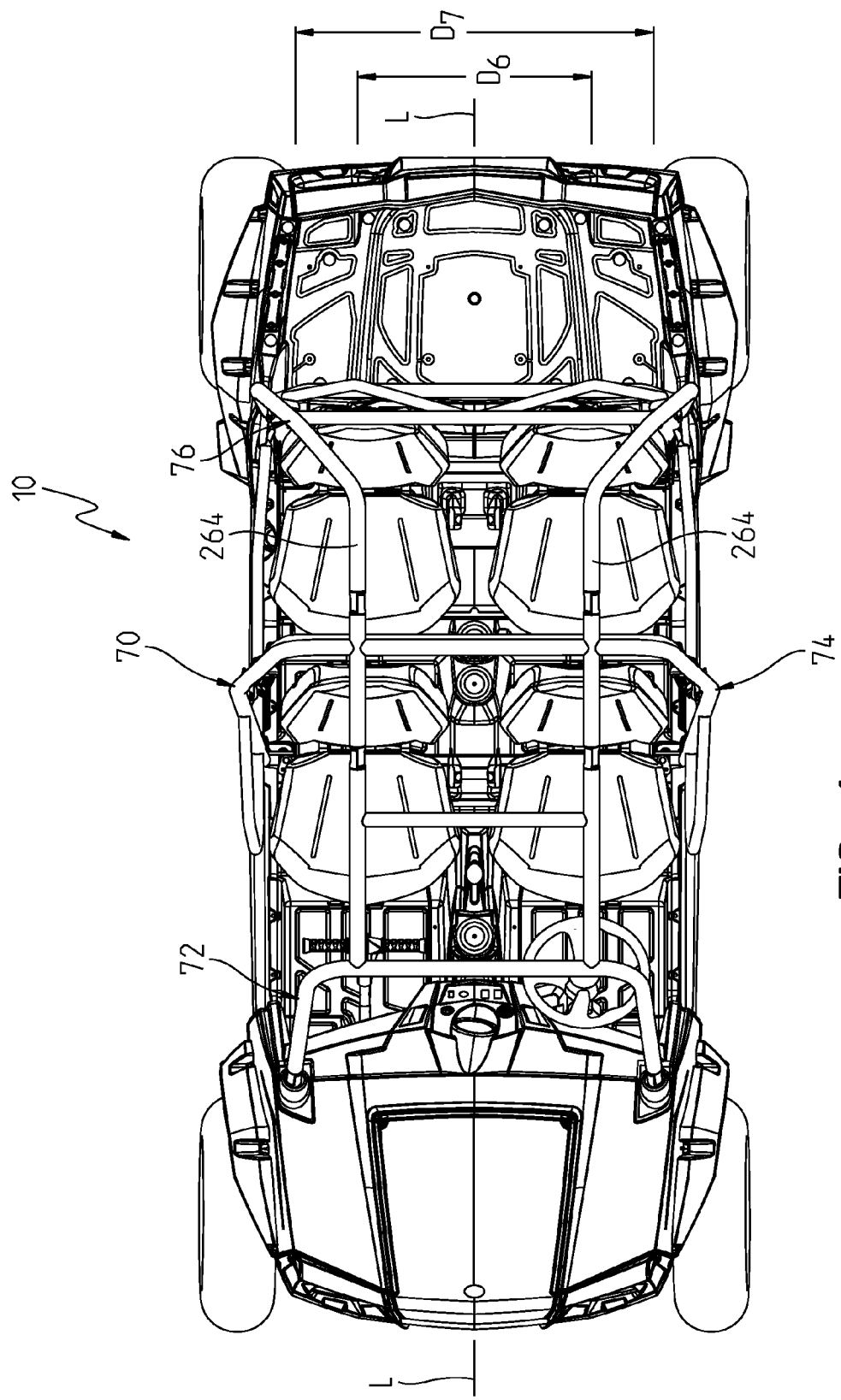
FIG. 4 shows a top view of the vehicle of FIG. 1.
Figure 6:
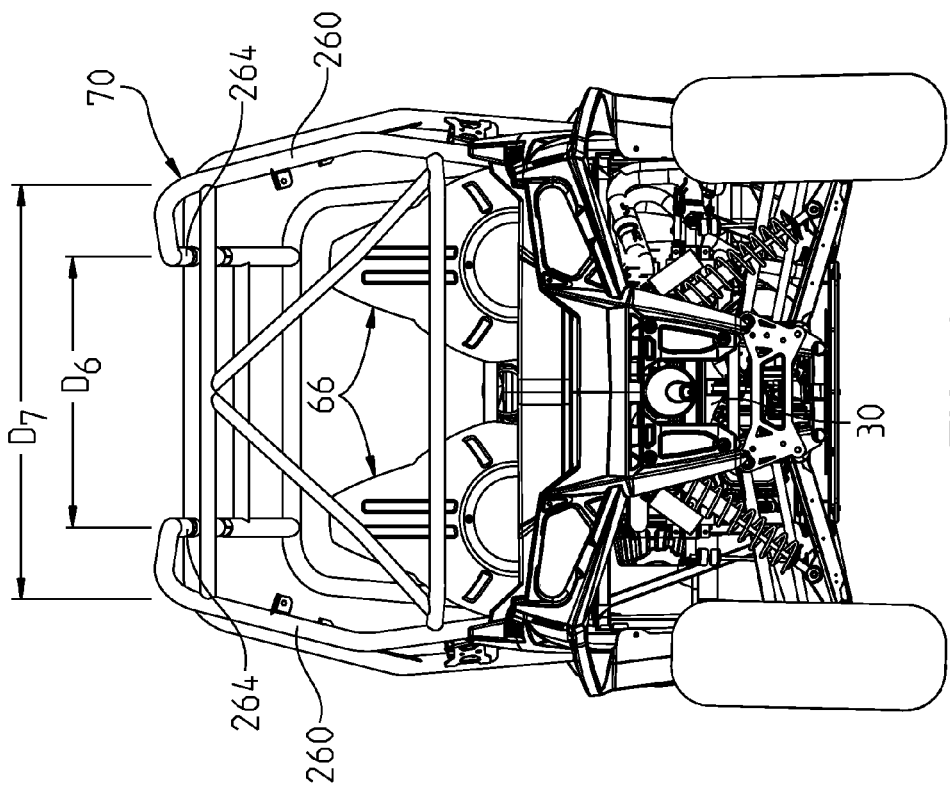
FIG. 6 shows a rear view of the vehicle of FIG. 1.
Figure 5:
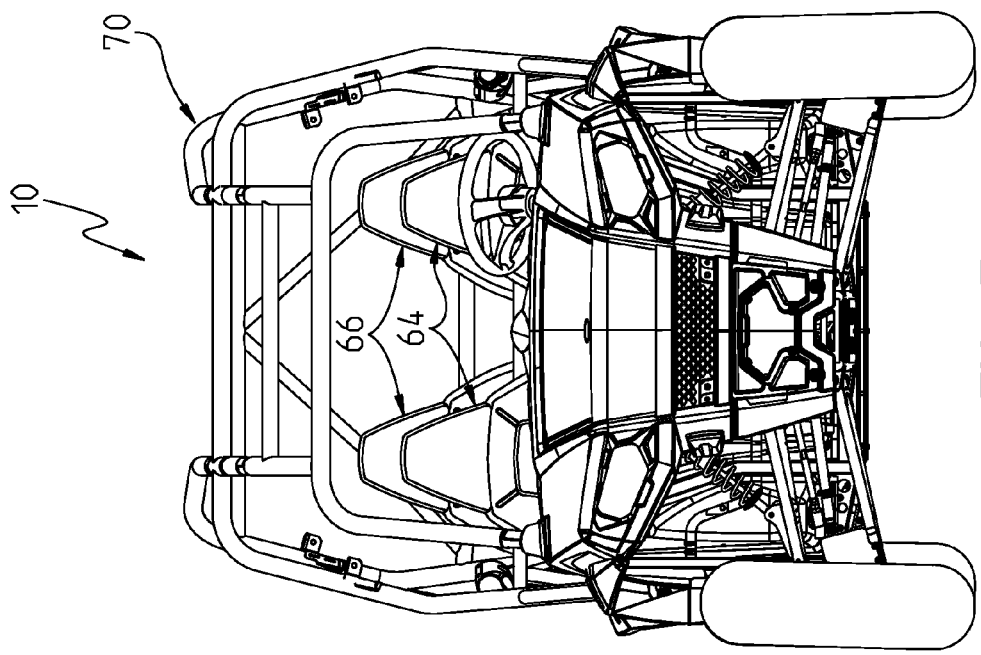
FIG. 5 shows a front view of the vehicle of FIG. 1.
Figure 7:
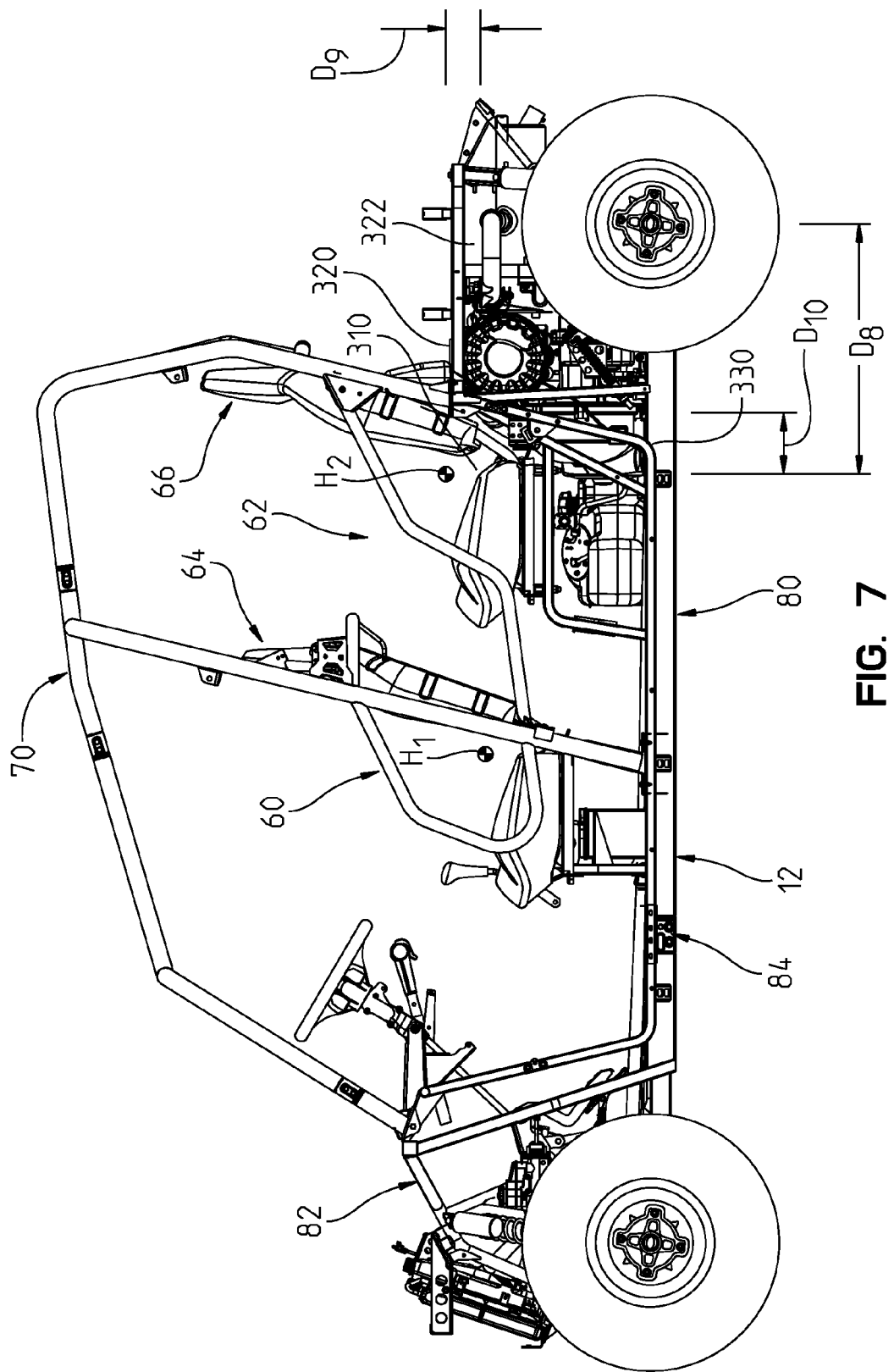
FIG. 7 shows a left side view of the vehicle similar to that of FIG. 3 showing the chassis removed.
Figure 8:
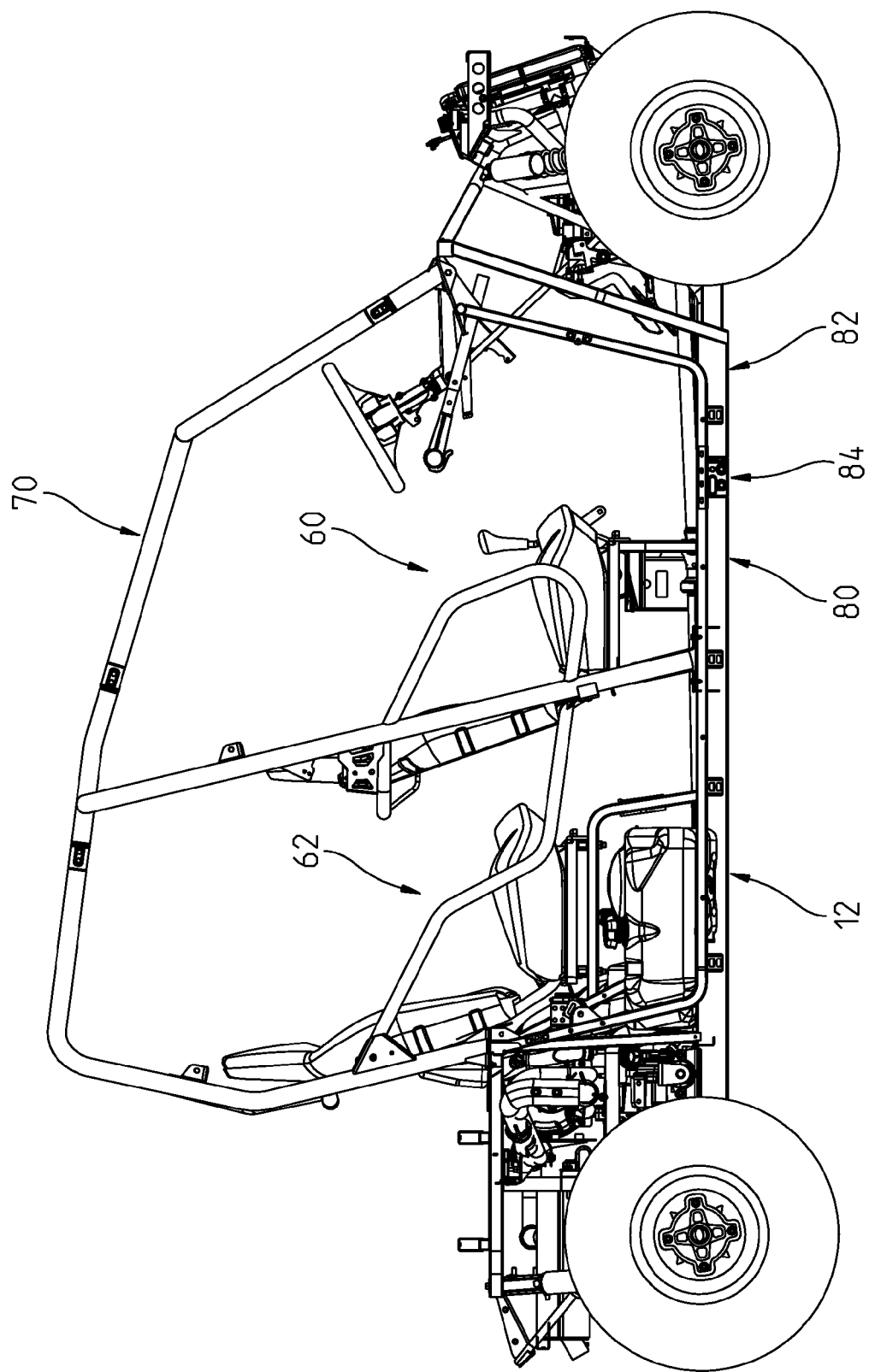
FIG. 8 shows the right side view of the vehicle of FIG. 7.

The vehicle design also provides easy ingress and egress. As shown best in FIG. 14, the driver and front passenger may easily enter vehicle 10 without contacting longitudinally extending sections 238. This is due to the fact that the distance ($D_6$) between sections 238 is less than the extreme position adjacent the top of uprights 234 ($D_5$) and is less than the distance between the extreme position adjacent the top of uprights 246 ($D_4$). This insetting of longitudinally extending sections 238 provides easy ingress. In a like manner relating to the rear passengers, and as best shown in FIGS. 4, 6 and 14, longitudinally extending section 264 are inset from extreme positions of both uprights 246 and 260, that is $D_6$ is less than both $D_2$ and $D_7$ (FIGS. 4 and 6). This provides easy ingress for rear passengers.

The design also provides an enhanced ride for the rear passenger. Due to the elevated rear seats 66, the rear passengers can view over the top of the front seats 64. As shown best in FIG. 7, the elevation of the seats is such that the hip pivot axis (H-point) of the rear passenger ($H_2$) is higher than the H-point of the driver ($H_1$). Also, for ride purposes, the H-point of the rear passenger ($H_2$) is positioned either over, or forward of, the centerline of the rear axle. As shown best in FIG. 7, $H_2$ and the axle centerline are spaced apart by a distance $D_8$. Also, in order to enhance the ride of the rear passenger, as well as keep the center of gravity low, a seating position 310 of the rear passenger is positioned lower than a top 320 of the engine 322. The seating position is the location on the seat having the highest distribution of load from the passenger while idle. This area is normally substantially adjacent to an intersecting line through the torso of the passenger and the seat bottom 66a. In the illustrated embodiment of FIG. 7, this distance is shown as $D_9$. Finally, seating position 310 is also forward of, a forward most point 330 of engine 322, and as shown best in FIG. 7, this distance is depicted as $D_{10}$. It should be appreciated that the seating positions could also be lower than the highest point 320 of engine 322 and behind the forward most point 330, if the seats laterally straddled the engine 322.

Figure 16:
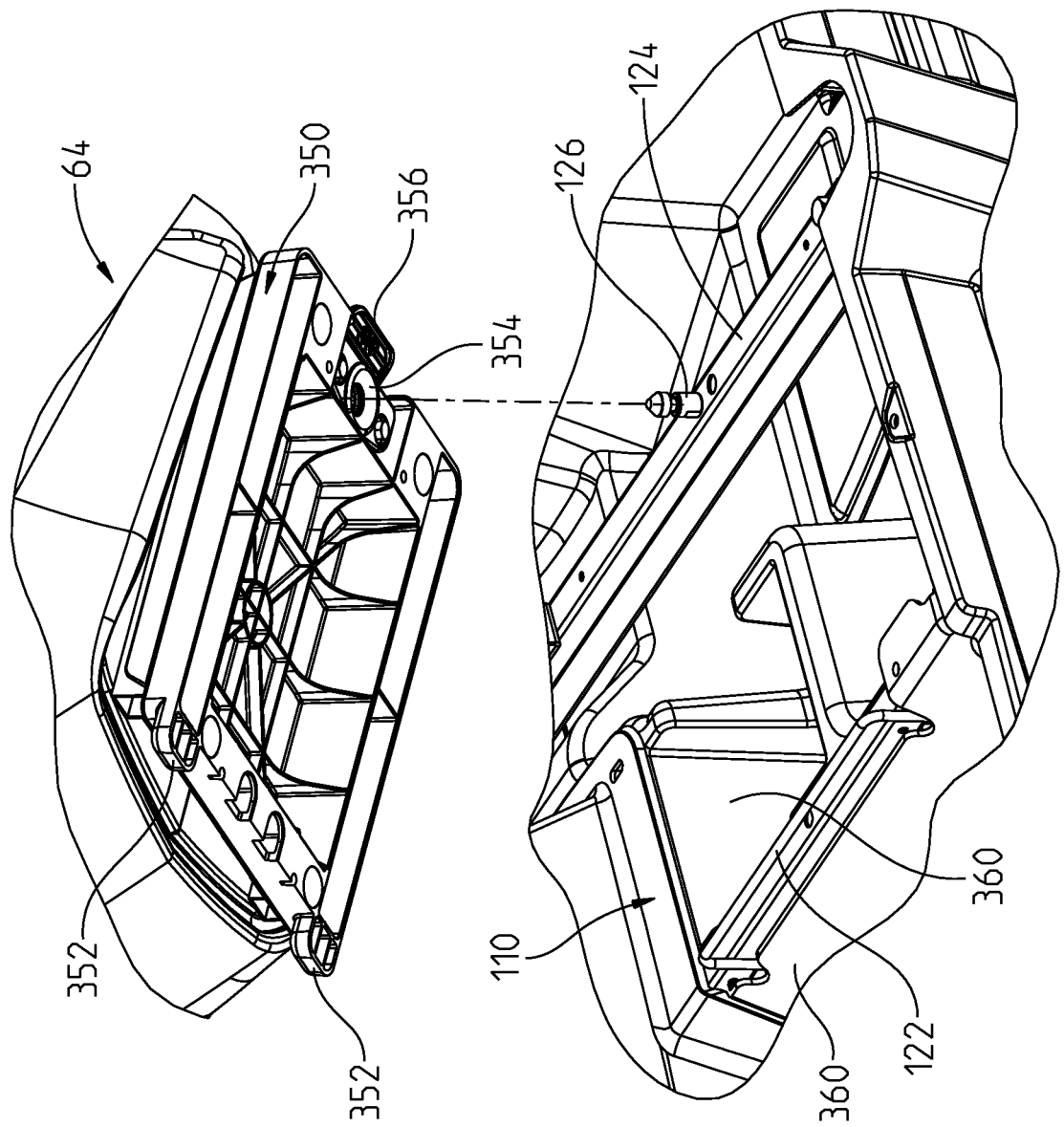
FIG. 16 shows a perspective view of the seat poised for receipt in one of the seating areas.

With respect now to FIG. 16, the vehicle 10 provides enhanced serviceability and functionality. As shown, each seat 64, 66 may be removed. The seat 64 is shown having a lower base 350 having locking feet 352 receivable under latch hook 122 and a latch 354 which is receivable over latching pin 126. Latch release 356 releases latch 354 from the latch-locked condition. Latch 354 is substantially similar to the latch shown in pending U.S. application Ser. No. 12/246,948 filed Oct. 7, 2008, the entirety of which is incorporated herein by reference. This provides access to a battery (not shown) in battery box 360. Also as transverse tube 124 is bolted to stand-offs 254 (FIG. 9), removal of tube 124 allows the molded covering 360 to be easily removed.

It should be appreciated that one or more of the rear seats 66 may be removed in an identical manner to that described with respect to front seats 64. Removing one or more of the rear seats may be desired if extra storage space is required and the space is not required for a rider. Also, accessory mounts could be provided (having a similar construction and footprint to that of seat base 350) and snapped in place in one or both seat positions. For example, such accessories could include coolers, tool boxes, trunks, water tanks, fuel containers, camping/fishing gear, a dog crate/kennel, and the like. This enhances the functionality of vehicle 10.

Figure 17:
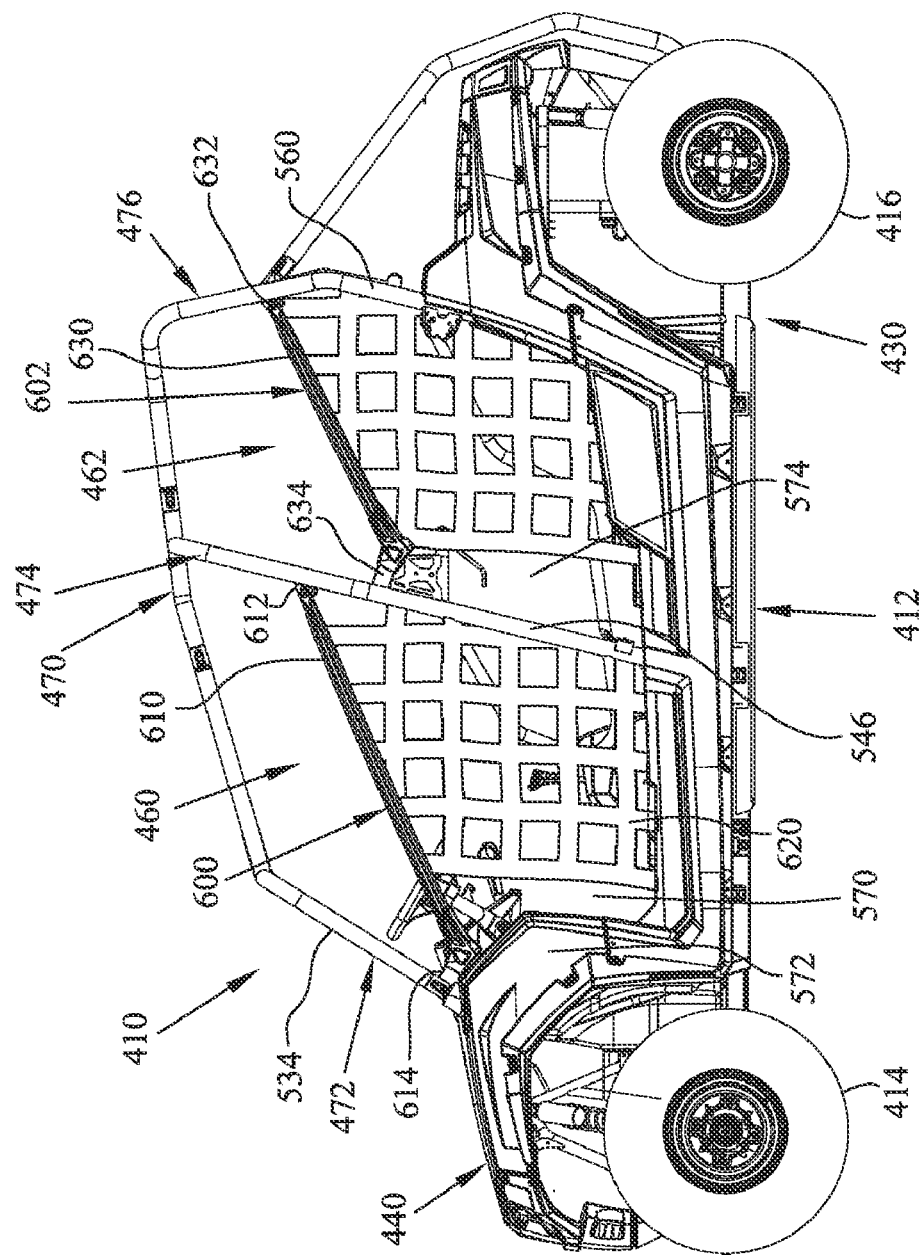
FIG. 17 shows a side view of an embodiment of the vehicle described above including collapsible side nets, with the nets in the up and latched position.

With respect now to FIG. 17, another embodiment of utility vehicle is shown at 410. The vehicle is substantially similar to that as described in FIGS. 1-16. Vehicle 410 includes a frame 412, with ground engaging members 414 and 416 in the form of tires, which are driven by a drive train 430. A body 440 surrounds the frame and forms the outer shell of the vehicle. A front seating area 460 and a rear seating area 462 are formed and would include seats similar to that described above as 64 and 66.

Vehicle 410 also includes a roll cage 470 which defines a canopy around first and second seating areas 460, 462. Roll cage 470 includes a front section 472, a center section 474 and a rear section 476. Roll cage 470 includes a front frame upright 534, a center frame upright 546 and a rear frame upright 560. As shown, a driver's ingress/egress 570 is defined between the center upright 546 and a front left fender 572. Similarly a left rear ingress/egress 574 is defined between center upright 546 and rear upright 570. Right side ingress/egress would also be provided in mirror image to the left hand side of the vehicle.

In this embodiment, and with reference to FIG. 17, a front side net assembly 600 is shown in the latched position and substantially encloses the driver's ingress/egress 570. In a similar manner, a left rear side net assembly 602 is shown which substantially encloses the left rear ingress/egress 574.

As shown, front side net assembly 600 is comprised of a pivotal bar 610 having an end which attaches to a pivot link 612 on the center upright 546 and an opposite end which is attached to a latching tongue 614 attached to front upright 534. Side net assembly 600 further comprises netting 620 fixed to the pivotal bar 610 as further described herein.

In a similar manner, rear side net assembly 602 is comprised of a pivotal bar 630 attached to a pivot link 632 attached to the rear upright 560 and to a latching tongue 634 attached to the rear side of center upright 546.

With reference now to FIGS. 19-23, pivotal bar 610 will be described in greater detail. As shown, pivot bar 610 includes a first end 640 and a second and opposite end 642. As shown best in FIG. 19, first end 640 includes an aperture 646 for pivotally mounting pivotal bar 16 whereas second end 642 includes a latch assembly 648 which is substantially similar to a seatbelt buckle having a slot 650 for receipt of tongue 614 (FIG. 17). Pivotal bar 610 further includes an end cap 652 comprised of cap parts 654 and 656 which are coupled together to surround latch assembly 648. Pivotal bar 610 further includes elongate halves 660 and 662 which define clamp parts which couple together in a clamshell-style to encompass the netting as described herein. As shown best in FIG. 20, clamp parts 660 and 662 define a slot 664 to receive the netting therethrough.

With reference to FIGS. 21-24, pivotal bar 610 will be described in greater detail. Elongate halves 660, 662 of pivotal bar 610 each include ribs 668, having interruptions at 670 as described herein. An aperture 672 is located opposite to aperture 646. A first clasp 680 is provided at the rearwardmost end of the net 620 (FIG. 24) and as shown best in FIG. 25, includes an aperture 682 and a slot at 684. A second clasp 690 is provided at the forwardmost end of the net 620 (FIG. 24) and as best shown in FIG. 26 includes an aperture 692, slot 694, apertures 696, and slots 698, 700.

Figure 24:
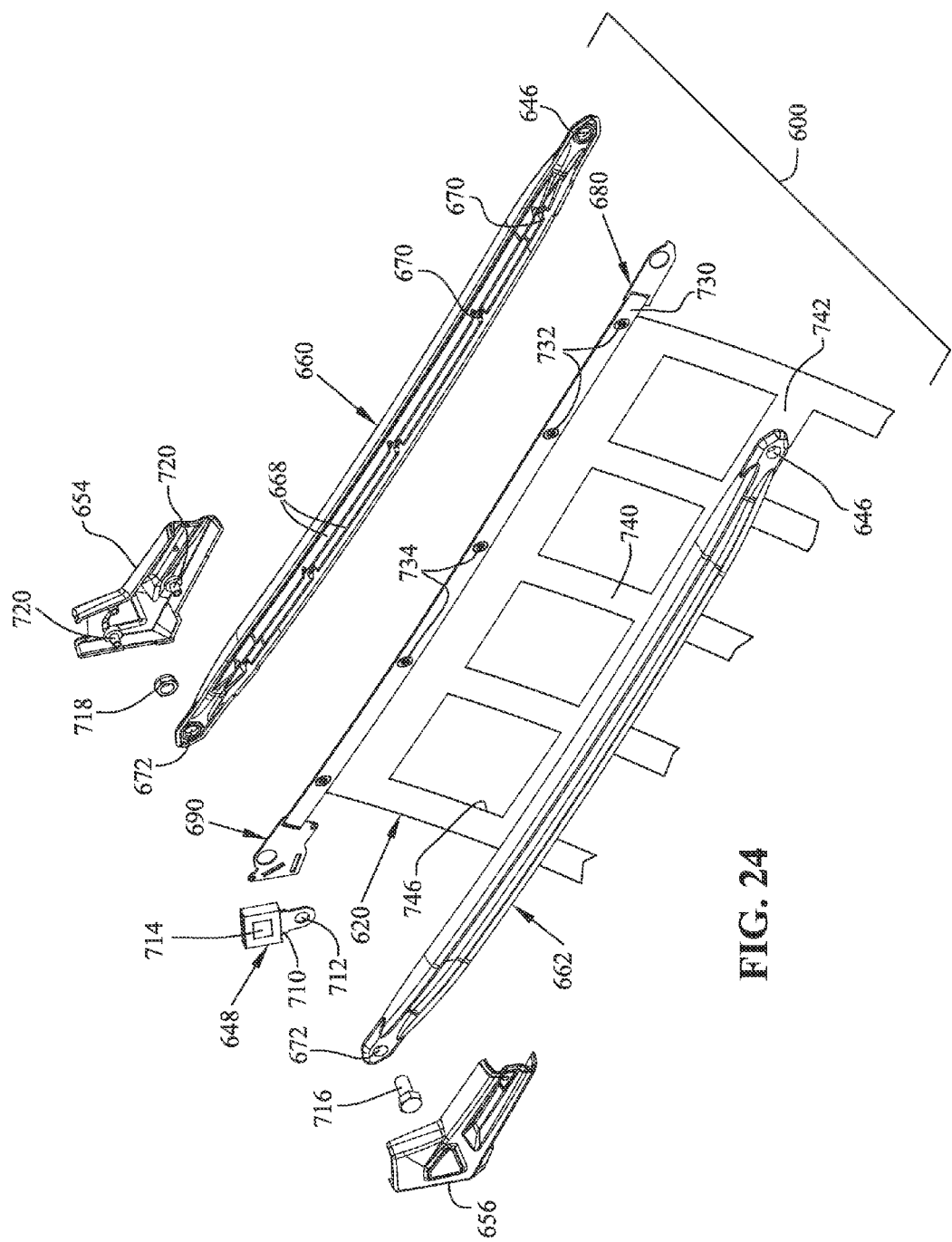
FIG. 24 shows a plan view of the pivotal bar separated, showing the netting poised for attachment to the bar.

As also best shown in FIG. 24, buckle 648 includes a mounting post 710 having an aperture 712. Buckle 648 also includes a release button 714. Fasteners in the form of a bolt 716, and nut 718 are also provided, as described herein. Furthermore, each of the end caps 654, 656 includes standoffs 720 which include apertures therethrough for receipt of other fasteners, as described herein.

With reference still to FIG. 24, netting 620 includes an upper marginal edge 730 having a plurality of openings 732 therethrough which are reinforced by eyelets 734. Netting 620 also includes vertical strap portions 740 and horizontal strap portions 742 which define openings 746 of the netting. It should be appreciated that any material could be used for the netting such as nylon strapping or it could be a one-piece molded pliable plastic material.

To assemble the netting 600, upper marginal edge 730 of the netting is sewn into slots 684 and 694 of the respective clasps 680, 690. Post 710 (FIG. 24) is placed in position adjacent to aperture 692 of clasp 690 (FIG. 26) and bolt 716 may be positioned through apertures 672 of halves 660, 662, passing through aperture 712 of buckle post 710 and through aperture 692 (FIG. 26) of clasp 690. Nut 718 may then be placed on the opposite side of elongate half 660 and joined with bolt 716. It should be appreciated that interruptions 670 provide recesses for the receipt of eyelets 734 and aperture 682 (FIG. 25) is positioned adjacent to apertures 646 of elongate halves 660, 662.

Figure 27:
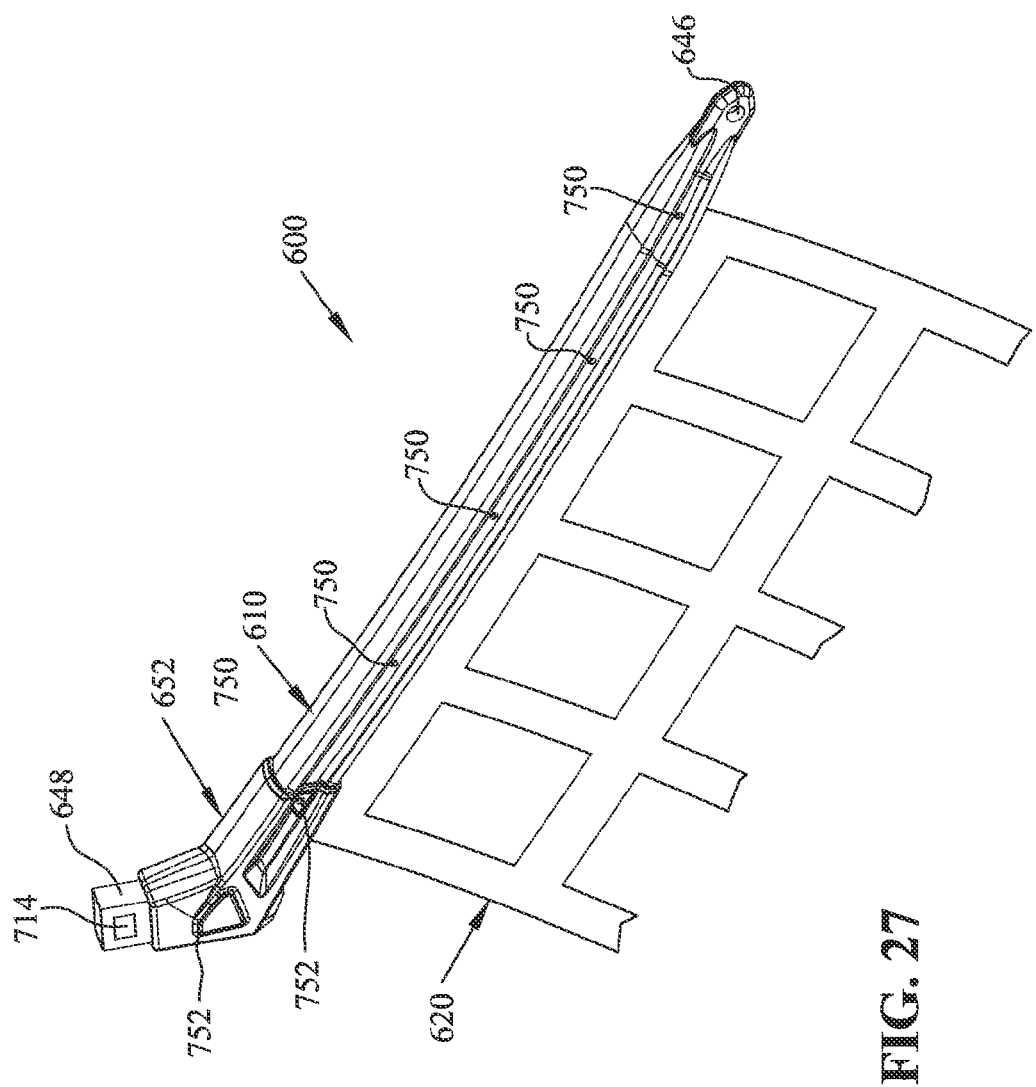
FIG. 27 shows an assemble view of the pivotal bar.

Fasteners may then be positioned through apertures 750 (see FIG. 27) which pass through apertures 732 of eyelets 734 (see FIG. 24) which retain net 620 to the pivotal bar 610. Fasteners are now positioned through apertures 752 (FIG. 27) which extend through standoffs 720 (FIG. 24) and which also pass through apertures 696 (FIG. 26) between the two end cap halves 654, 656. When in position, end cap 648 encompasses fasteners 716, 718, and also positions buckle 648 in its proper upright position. As assembled, side netting 600 can now be attached to central upright 646 by positioning a fastener through aperture 646 (FIG. 27) and through pivot member 612. The lower end of the netting would also include eyelets which are fastened to the vehicle floorboard.

Figure 18:
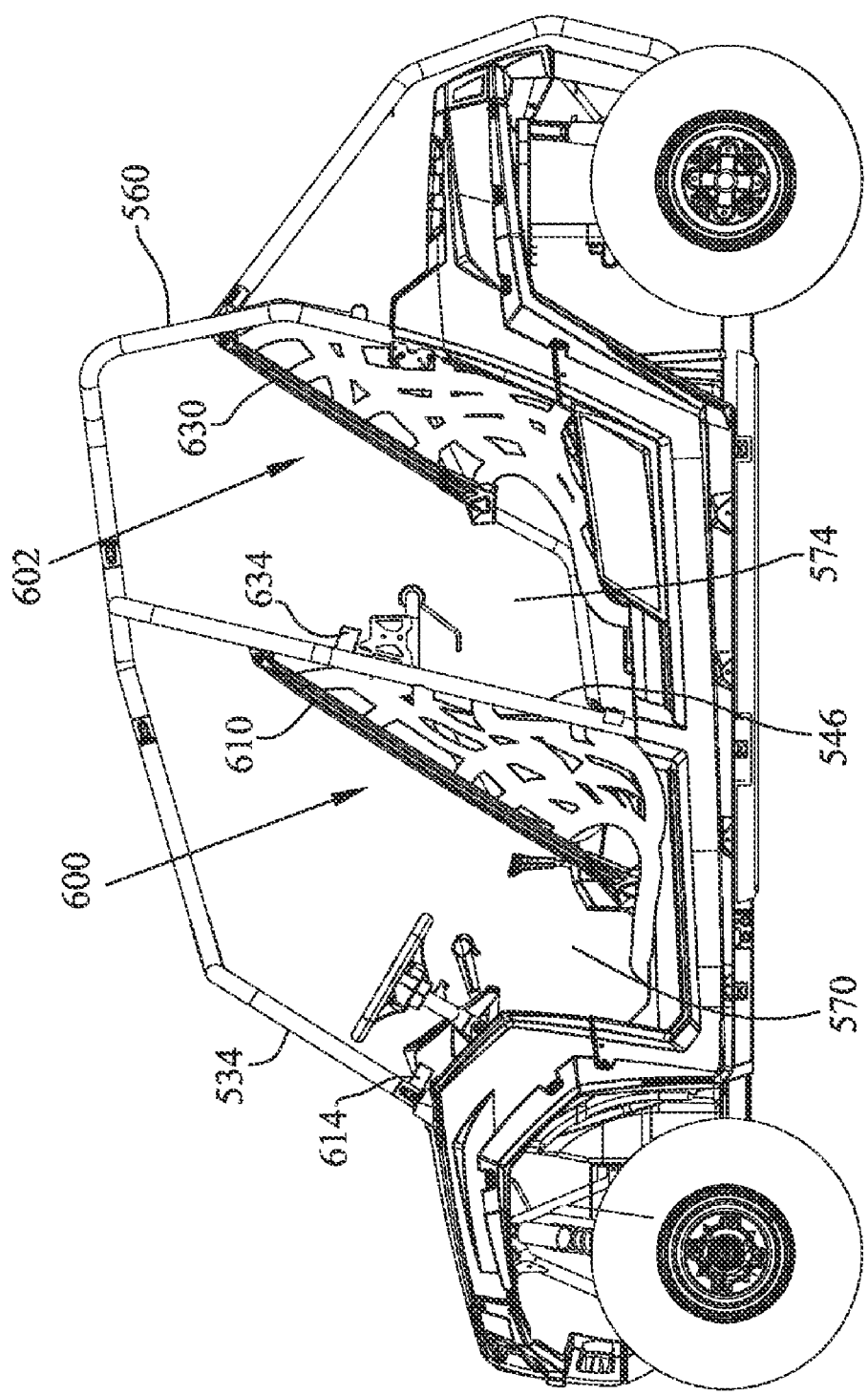
FIG. 18 shows a side view of the embodiment of the vehicle of FIG. 17 with the nets in the collapsed and unlatched position.
Figure 19:
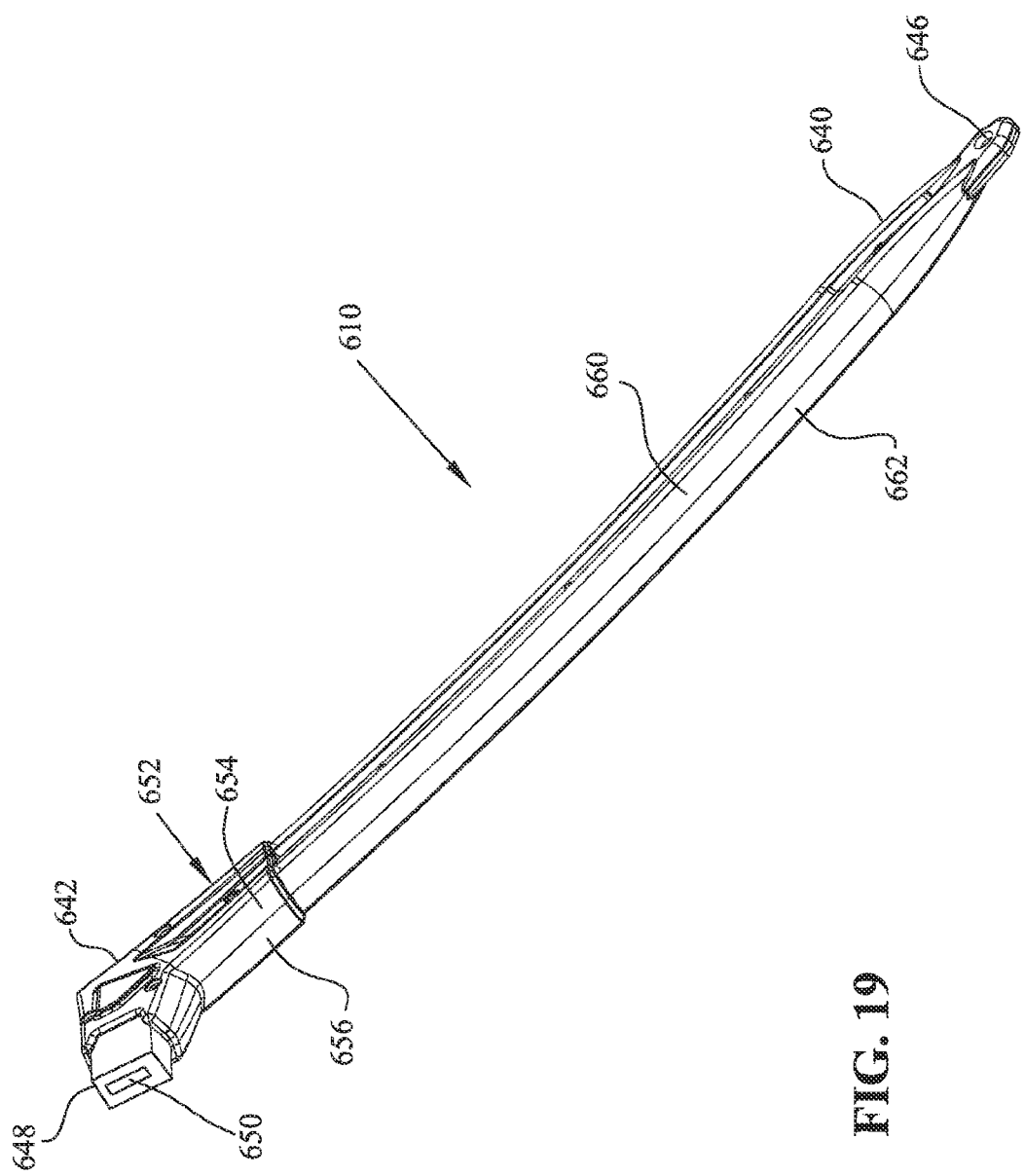
FIG. 19 shows a top perspective view of the pivotal bar.
Figure 20:
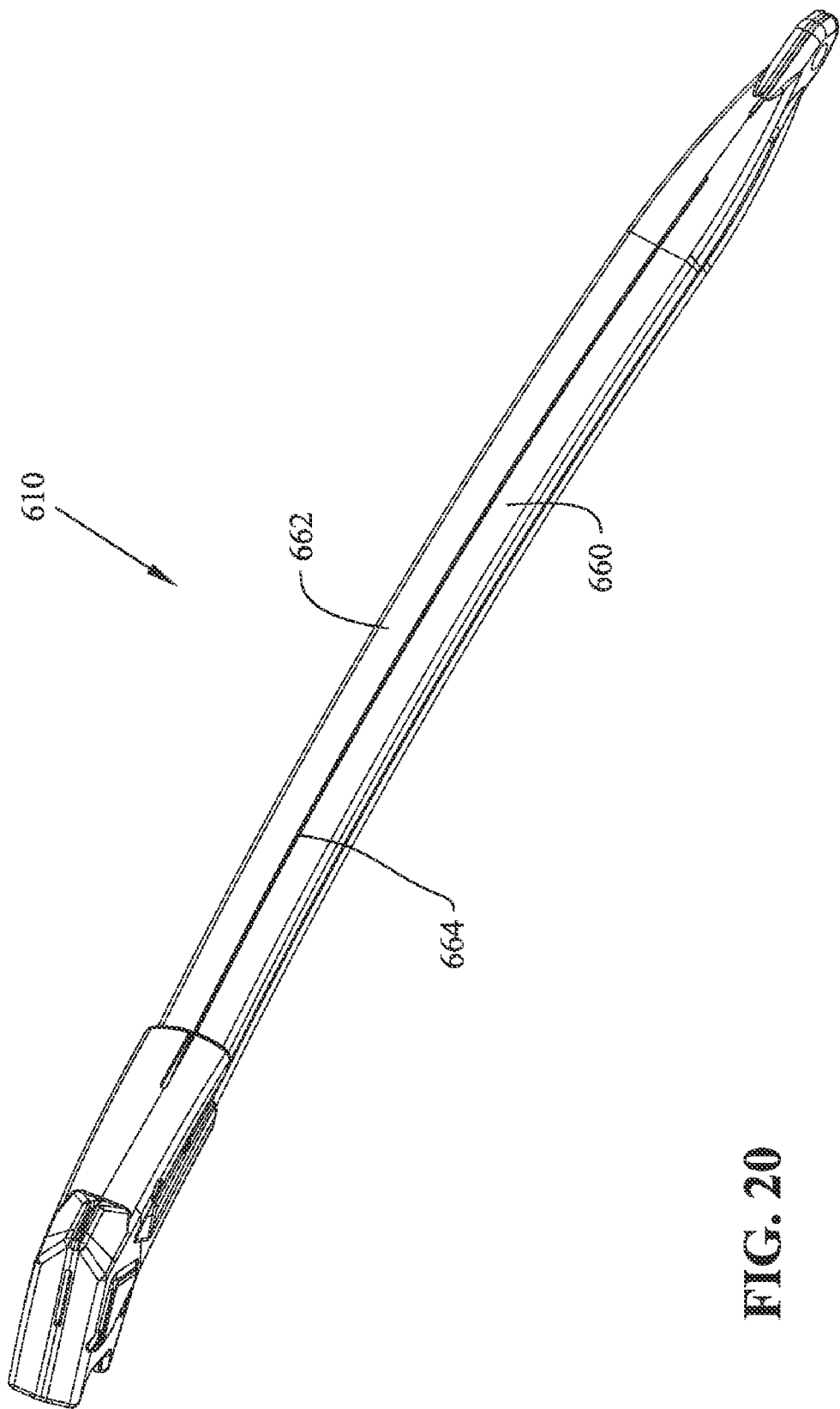
FIG. 20 shows a bottom perspective view of the pivotal bar of FIG. 19.
Figure 23:
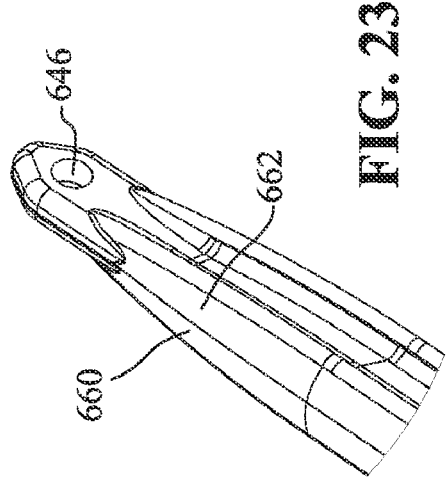
FIG. 23 shows an enlarged view of the portion denoted in FIG. 21.
Figure 22:
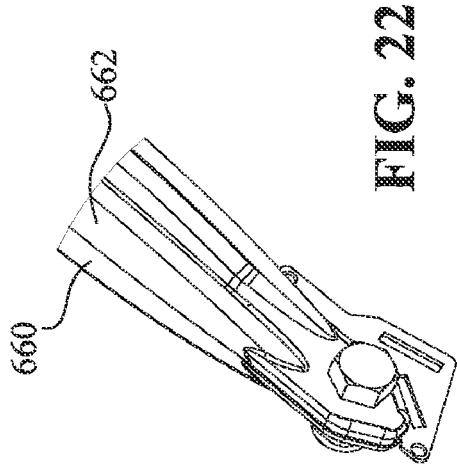
FIG. 22 shows an enlarged view of the portion denoted in FIG. 21.
Figure 21:
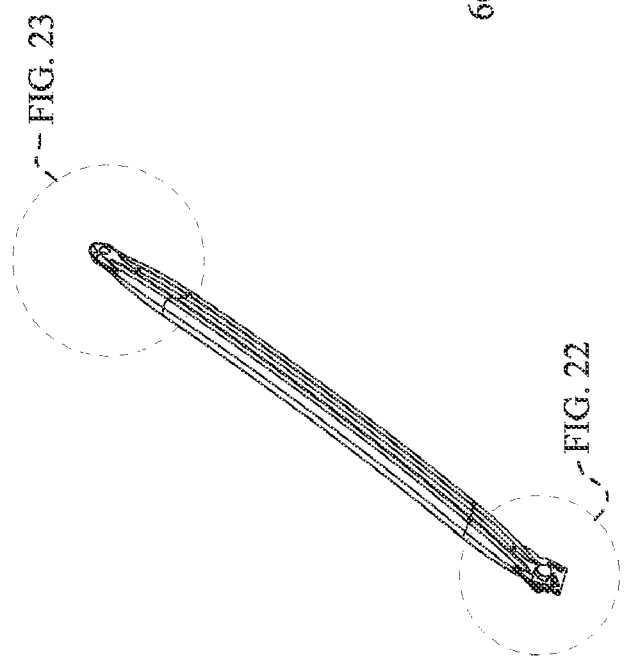
FIG. 21 shows a bottom perspective view of the pivotal bar of FIG. 19 with the end cap removed.

With reference again to FIG. 17, side netting 600 substantially encloses the driver ingress/egress 570 when the buckle 640 is latched to the associated latching tongue 614. When the release button 714 is actuated, the buckle 648 is released from the latching tongue 614 which allows the pivotal bar 610 to rotate counterclockwise to the position shown in FIG. 18, where the pivotal bar 610 and the net 620 are in a collapsed position. This opens up the driver's ingress/egress 570 allowing the driver to enter or exit from the vehicle. It should be appreciated that, and as best viewed in FIGS. 19 and 20, the pivotal bar 610 is bowed outwardly which provides increased interior room for the driver. It should also be appreciated that a pivotal bar 610 on the front passenger side, would also be bowed outwardly, or would be a mirror image of the pivotal bar 610 as described and as displayed in FIGS. 19 and 20. Finally, it should also be appreciated that pivotal bar 602 could be assembled in an identical manner as just described to cover the ingress/egress 574 for the rear passengers.

With respect now to FIGS. 28-33, another embodiment of utility vehicle is shown at 810. The vehicle is substantially similar to that as described in FIG. 1-16 or 17-27. The vehicle 810 includes a frame 812, and although not specifically shown, would include ground engaging members in the form of tires, which are driven by a drive train. A body 840 surrounds the frame and forms the outer shell of the vehicle. A front seating area 860 is formed and would include seats similar to that described above as 64 and 66. Vehicle 810 could be a 2 passenger or a 4 passenger vehicle, but as shown is a 2 passenger vehicle.

Vehicle 810 also includes a roll cage 870 which defines a canopy around front seating area 860. Roll cage 870 includes a front section 872 and a rear section 876. Furthermore, the vehicle would include a driver's ingress/egress and a passenger's ingress/egress. The passenger's ingress/egress is shown at 874 between front section 872 and rear section 876.

Figure 28:
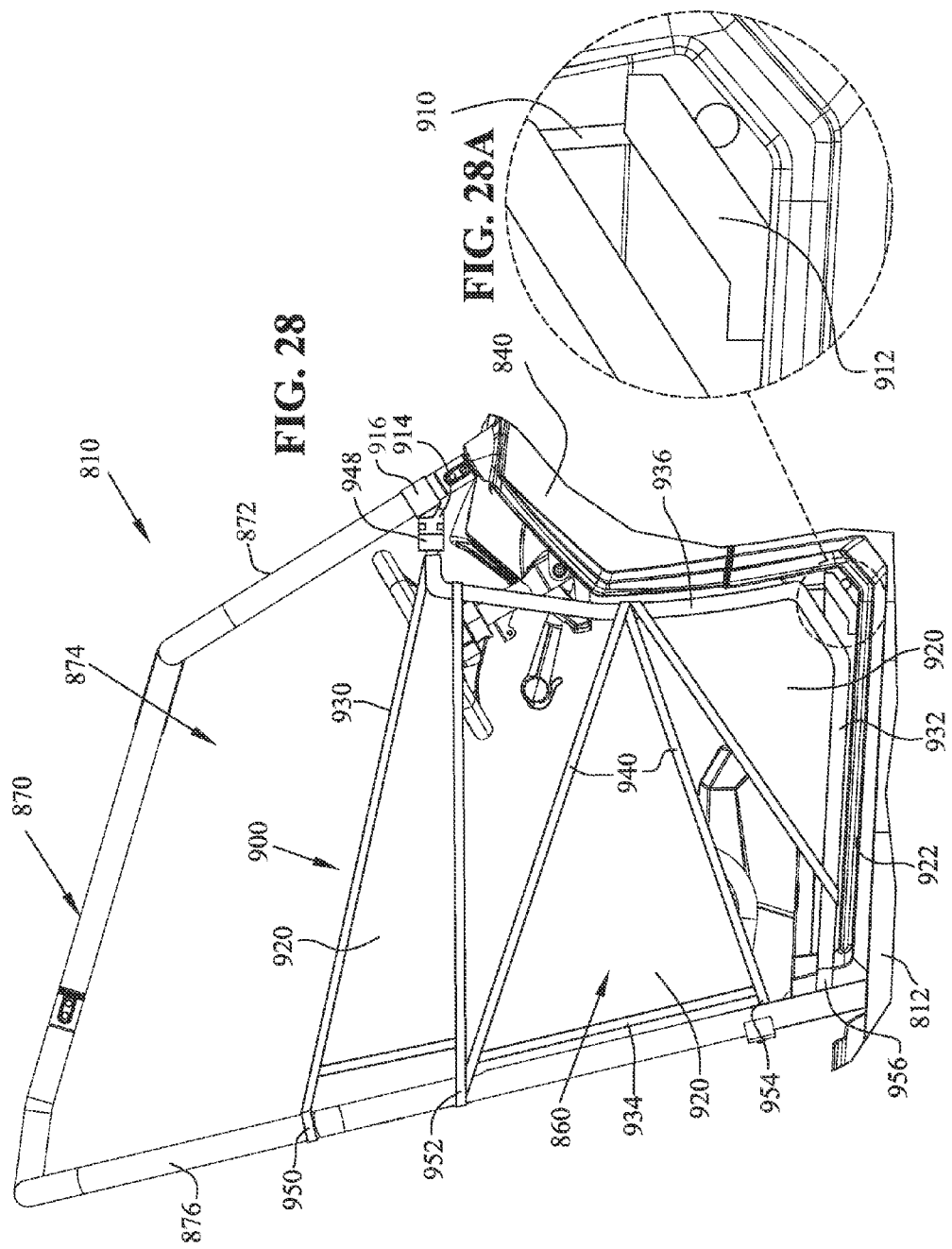
FIG. 28 is a right hand side view of an alternate side net assembly.

In this embodiment, and with reference to FIG. 28, a side net assembly 900 is shown in the latched position and substantially encloses the passenger's ingress/egress 874. As shown, side net assembly 900 is comprised of a pivotal bar 910 (FIG. 28A) having an end which attaches to a pivot link 912 on the floorboard 922 and an opposite end which is positioned within a marginal edge 936 of netting 920. A latching tongue 914 attaches to front section 872. Latching tongue 914 is tethered to front section 872 by a strap or clamp, and a clip 916 (FIGS. 28 and 29) is clipped to the front section 872. The clip 916 has arms which surround and rigidify the latching tongue 914, in order to make the latching process a one handed operation.

Figure 30:
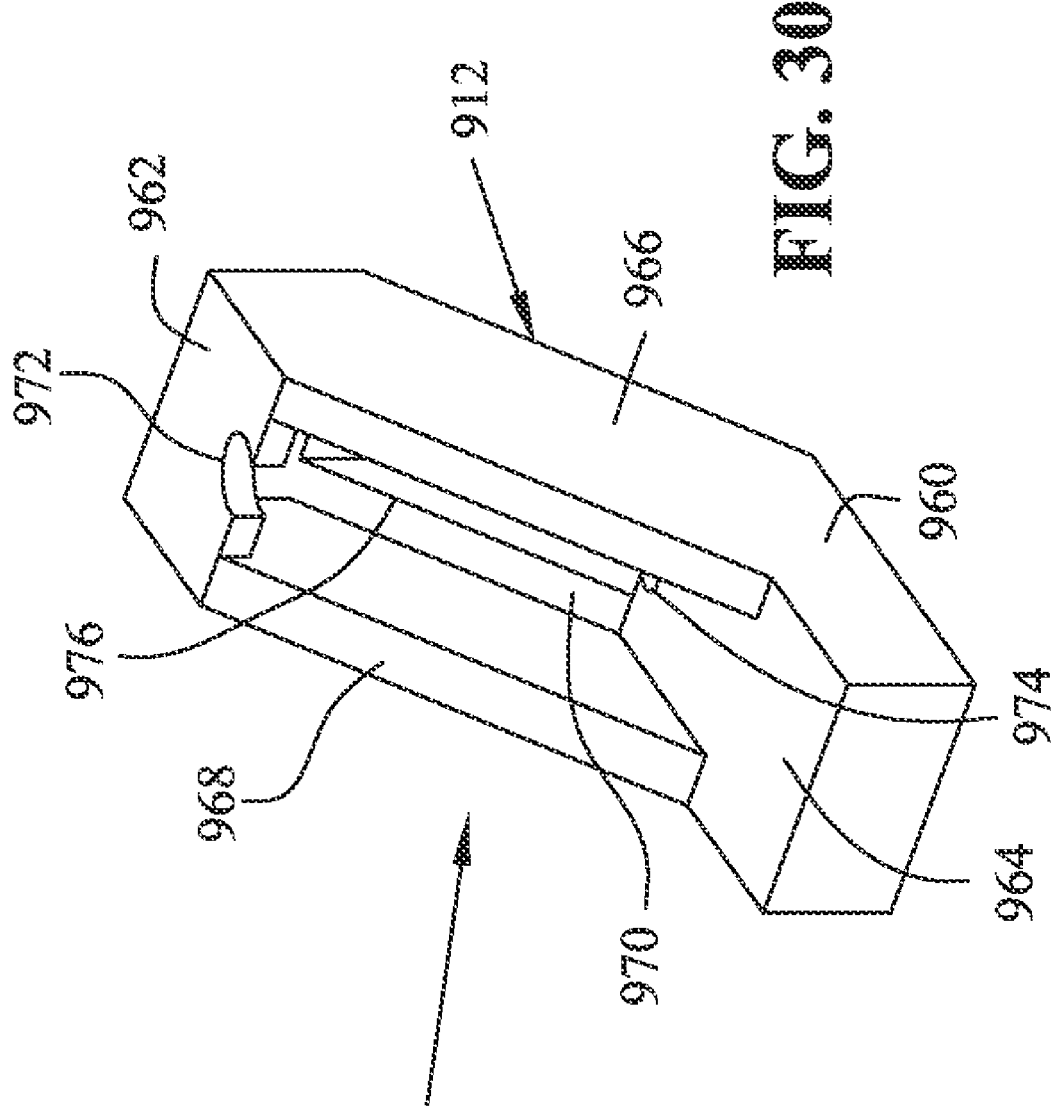
FIG. 30 shows a view of the side net post poised for receipt in the pivotal link.

With reference now to FIGS. 28A and 30, pivotal bar 910 will be described in greater detail. As shown, pivotal bar 910 includes rod 920 having a first end 940 and a second and opposite end (not shown). As shown best in FIGS. 28A and 30, first end 940 includes an enlarged end 946 for pivotally mounting pivotal bar 910 whereas second end is positioned and fixed within the marginal edge 936 of netting 920.

With reference to FIG. 30, pivot link 912 will be described in greater detail. Pivot link 912 includes a trapezoidally shaped body 960 having an upper wall 962, lower wall 964, side walls 966 and 968, and rear wall 970. Upper wall 962 includes a semi-circular opening 972 (opening rearwardly) and lower wall 964 includes a semi-circular opening 974 (opening forwardly). Rear wall 970 includes a slot 976 which feeds into semi-circular opening 974. Semi-circular opening 974 is larger than a diameter of rod 920 but smaller than a diameter of enlarged end 946. Slot 976 is larger than a profile of enlarged end 946.

With reference again to FIG. 28, netting 920 includes an upper marginal edge 930, lower marginal edge 932, rear marginal edge 934 and front marginal edge 936. Netting 920 also includes strap portions 940. It should be appreciated that any material could be used for the netting such as nylon strapping or it could be a one-piece molded pliable plastic material.

Figure 29:
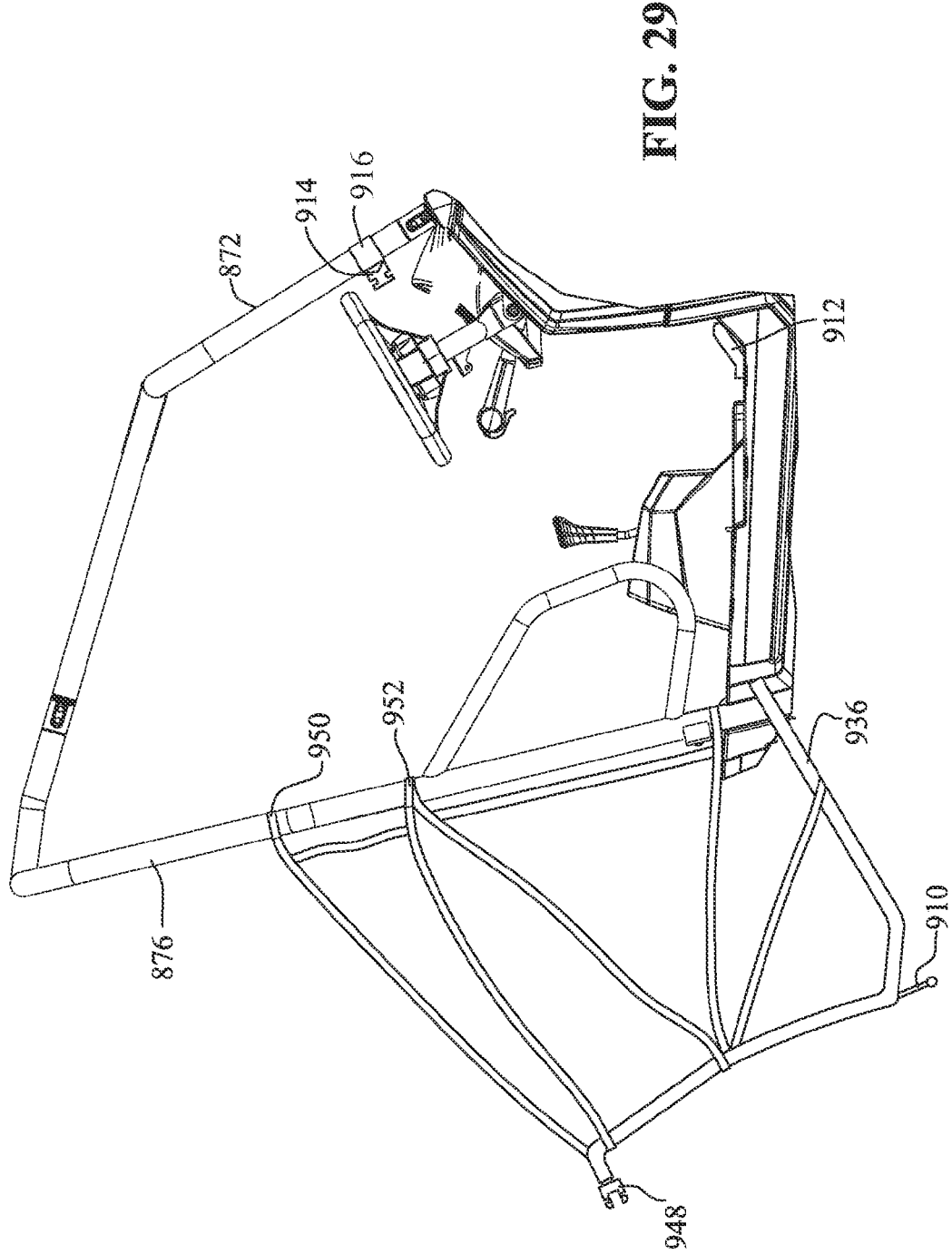
FIG. 29 shows the side net assembly of FIG. 28 with the side net collapsed.

As also best shown in FIGS. 28 and 29, net assembly 900 would include buckle 948 attached to an end of marginal edge 936 of net 900. Buckle 948 includes a release button (not shown) substantially the same as that shown in FIG. 24. Side net 920 is also hinged about the rear section 876 at points 950, 952, 954 and 956. This allows the side nets 020 to swing open when latch 948 is released.

With reference still to FIG. 28, side net assembly 900 substantially encloses the driver ingress/egress 874 when the buckle 948 is latched to the associated latching tongue 914. When the release button is actuated, the buckle 948 is released from the latching tongue 914 which allows the net 900 to rotate to the position shown in FIG. 29, where the pivotal bar 910 and the net 920 are in a collapsed position. This opens up the driver's ingress/egress 874 allowing the driver to enter or exit from the vehicle.

To latch the net assembly 900, and with reference to FIGS. 30-33, the pivot bar 910 is positioned with enlarged end 946 towards pivot link 912, such that the enlarged end 946 is positioned through slot 976 (FIG. 30). Pivot bar 910 is then rotated as shown in FIG. 32 which positions enlarged end 946 below opening 974, and rod portion 920 in opening 974. Continued rotation of pivot bar 910 to the position of FIG. 33 causes the pivot bar 910 to also be positioned in opening 972. The buckle 948 is then latched with latch 914 to create the latched condition of FIG. 28.

While this invention has been described as having an exemplary design, the present invention may be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains.

What is claimed is:

1. A utility vehicle, comprising:
a frame extending in a generally longitudinal direction;
a drive train supported by the frame;
a plurality of wheels operably coupled to the frame;
a first seating area; and
a side net assembly comprised of a pivotal bar and a net supported by the pivotal bar, the bar being pivotally mounted at a first end to the vehicle, and the net being latchable to the vehicle, whereby the side net assembly can be in a latched position when a rider is in the vehicle and can be collapsed to allow ingress and egress of a rider.

2. The utility vehicle of claim 1, wherein the first seating area is comprised of a seat having a seat bottom and a seat back.

3. The utility vehicle of claim 1, wherein the frame comprises a frame upright positioned adjacent to the seat back and further comprises a roll cage including a front frame upright forward of the first seating area.

4. The utility vehicle of claim 3, wherein the side net assembly is latchable to the front frame upright.

5. The utility vehicle of claim 4, wherein a latching tongue is attached to the front frame upright and the side net assembly further comprises a latching buckle connectable to the latching tongue.

6. The utility vehicle of claim 1, wherein the pivotal bar is mounted along a marginal edge of the net.

7. The utility vehicle of claim 6, wherein the pivotal bar is mounted along a top marginal edge of the net and is pivotally mounted to the frame upright.

8. The utility vehicle of claim 1, wherein the pivotal bar is formed as a clam shell style, with a portion of the net trapped therebetween.

9. The utility vehicle of claim 8, wherein the net has a top marginal reinforced edge with openings therethrough, the pivotal bar being held together by fasteners extending through the pivotal bar and through the openings.

10. The utility vehicle of claim 9, wherein the openings have reinforced eyelets.

11. The utility vehicle of claim 1, wherein the first seating area is defined by side-by-side seats, defining two rider positions and two side net assemblies are provided.

12. The utility vehicle of claim 6, wherein the pivotal bar is mounted to the front marginal end of the net.

13. The utility vehicle of claim 12, wherein the pivotal bar is positionable in a front pivot link mounted to the front end of a floorboard.

14. A utility vehicle, comprising:
a frame extending in a generally longitudinal direction;
a drive train supported by the frame;
a plurality of wheels operably coupled to the frame;
a first seating area at a first longitudinal position relative to the frame;
a frame canopy enclosing the first seating area, and defined by a plurality of frame tubes coupled to the frame, at least some of the frame tubes being in the form of frame uprights, and the frame tubes defining an envelope around the first seating area; and
a side net assembly supported by one of the frame uprights and being latchable to another of the frame uprights, the side net assembly comprising a rigidified marginal edge pivotally movable relative to the vehicle, whereby the side net assembly can be in a latched position when a rider is in the vehicle and can be collapsed to allow ingress and egress of a rider.

15. The utility vehicle of claim 14, wherein the top edge of the side net assembly is rigid.

16. The utility vehicle of claim 15, wherein the side net assembly is comprised of a rigid pivotal bar and a net supported by the pivotal bar.

17. The utility vehicle of claim 14, wherein the first seating area is comprised of a seat bottom and a seat back.

18. The utility vehicle of claim 14, wherein the frame canopy includes a center frame upright positioned adjacent to the seat back and the side net assembly is pivotally mounted to the center frame upright.

19. The utility vehicle of claim 18, wherein the frame canopy including a front frame upright forward of the first seating area, the side net assembly being latchable to the front frame upright.

20. The utility vehicle of claim 19, wherein the side net assembly is comprised of a pivotal bar and a net supported by the pivotal bar.

21. The utility vehicle of claim 20, wherein a latching tongue is attached to the front frame upright and a latching buckle is attached to the second end of the pivotal bar.

22. The utility vehicle of claim 21, wherein the pivotal bar is formed as a clam shell style, with a portion of the net trapped therebetween.

23. The utility vehicle of claim 22, wherein the net has a top marginal reinforced edge with openings therethrough, the pivotal bar being held together by fasteners extending through the pivotal bar and through the openings.

24. The utility vehicle of claim 14, wherein the frame canopy includes a center frame upright positioned adjacent to the seat back and the side net assembly is mounted to the center frame upright.

25. The utility vehicle of claim 18, wherein the frame canopy including a front frame upright forward of the first seating area, the side net assembly being latchable to, and pivotally mounted relative to, the front frame upright.

26. A side net assembly for a utility vehicle, where the vehicle includes a frame extending in a generally longitudinal direction, a first seating area at a first longitudinal position relative to the frame and a frame canopy enclosing the first seating area, and defined by a plurality of frame uprights coupled to the frame defining an envelope around the first seating area, a side net assembly comprised of a pivotal bar and a net supported by the pivotal bar, the side net assembly being supported by at least one of the frame uprights and being latchable to at least one of the frame uprights, whereby the side net assembly can be in a latched position when a rider is in the vehicle and can be collapsed to allow ingress and egress of a rider.

27. The utility vehicle of claim 26, wherein the first seating area is comprised of a seat bottom and a seat back.

28. The utility vehicle of claim 27, wherein the frame canopy includes a front frame upright forward of the first seating area, the side net assembly being latchable to the front frame upright.

29. The utility vehicle of claim 28, wherein a latching tongue is attached to the front frame upright and a latching buckle is attached to the front end of the pivotal bar.

30. The utility vehicle of claim 29, wherein the frame canopy includes a center frame upright positioned adjacent to the seat back and the side net assembly is pivotally mounted to the center frame upright.

31. The utility vehicle of claim 28, wherein the pivotal bar is positioned in a front generally vertical marginal edge of the net.

* * * * *